US012743334B2

(12) United States Patent
Sivajothi et al.

(10) Patent No.: US 12,743,334 B2
(45) Date of Patent: Sep. 22, 2026

(54) SYSTEM AND METHOD FOR DETECTING AND REMEDYING FAULTY FAILOVER OF EDGE NETWORK COMPUTING DEVICES BASED ON MONITORED SENSOR DATA

(71) Applicant: Bank of America Corporation, Charlotte, NC (US)

(72) Inventors: Sivashalini Sivajothi, Chennai (IN); Maneesh Kumar Sethia, Hyderabad (IN); Parameswari K, Chennai (IN); Keerthana Subramani, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 29 days.

(21) Appl. No.: 19/052,671

(22) Filed: Feb. 13, 2025

(65) Prior Publication Data

US 2026/0236339 A1 Aug. 13, 2026

(51) Int. Cl.
*G06F 11/00* (2006.01)
*G06F 11/07* (2006.01)

(52) U.S. Cl.
CPC ...... *G06F 11/0793* (2013.01); *G06F 11/0754* (2013.01); *G06F 11/0787* (2013.01)

(58) Field of Classification Search
CPC ............. G06F 11/0751; G06F 11/0754; G06F 11/0787; G06F 11/0793; G06F 11/2252; G06F 11/2257; G06F 11/2263
See application file for complete search history.

(56) References Cited

U.S. PATENT DOCUMENTS

| | | | |
|---|---|---|---|
| 8,015,455 | B1 | 9/2011 | Vannatter et al. |
| 8,538,694 | B2 | 9/2013 | Conway |
| 8,612,140 | B2 | 12/2013 | Gutman |
| 9,368,000 | B2 | 6/2016 | Ramachandran et al. |
| 9,558,636 | B1 | 1/2017 | Burdick |
| 9,858,556 | B2 | 1/2018 | Miller et al. |
| 10,318,963 | B1 | 6/2019 | Prasad et al. |
| 10,332,358 | B1 | 6/2019 | Burks et al. |
| 10,977,630 | B2 | 4/2021 | DeLuca et al. |
| 11,468,416 | B2 | 10/2022 | Chauhan et al. |
| 2008/0110975 | A1 | 5/2008 | Shepley et al. |

(Continued)

OTHER PUBLICATIONS

Sivashalini Sivajothi, "System and method for location-based monitoring of computing node parameters based on sensor data;" U.S. Appl. No. 19/052,738, filed Feb. 13, 2025.

*Primary Examiner* — Marc Duncan

(57) ABSTRACT

A system for detecting an anomalous operation associated with a computing node and remedying the anomalous operation to resolve the malfunction associated with the anomalous operation. A processor is operably coupled to the memory and configured to receive a fault event message from a computing node. The fault event message comprises a fault event identifier and one or more computing node parameters. In response to determining that the received fault event identifier is not a known fault event identifier, the AI algorithm to identify a first set of procedures based at least in part on a data value associated with one or more computing node parameters not exceeding a predefined threshold value. The first set of procedures includes one or more potential remedy actions. The processor sequentially executes the potential remedy actions on the computing node.

20 Claims, 13 Drawing Sheets

(56) References Cited

U.S. PATENT DOCUMENTS

2011/0047150 A1* 2/2011 Wolf .................. G06F 11/2294 707/723
2012/0194553 A1 8/2012 Osterhout et al.
2014/0247283 A1 9/2014 Jo
2015/0198446 A1 7/2015 Perez et al.
2018/0300991 A1 10/2018 Park
2023/0195560 A1* 6/2023 Haririan ............. G06F 11/0772 714/26
2023/0376025 A1 11/2023 Nkhata
2025/0322339 A1* 10/2025 Hariharan .......... G06Q 10/0637

* cited by examiner

Historical events dataset 118

| Known fault event identifier 124 | | Known faulty operations 120 | Known remedy actions 122 | Number of successful fixes (183) |
|---|---|---|---|---|
| 124a E001 | 120a | **Known Faulty operation 1:** Keypad registering incorrect input becuase new software patch installed is incompatible | (122a) **Known Remedy action 1:** Identifying lowest latency neighboring computing node to request software program update | 50 |
| 124b E002 | 120b | **Known Faulty operation 2:** Tampering event | (122b) **Known Remedy action 2:** Check for Unexpected fluctuation of electrical signals caused by one or more components | 25 |
| 124c E003 | 120c | **Known Faulty operation 3:** Keypad not responding | (122c) **Known Remedy action 3:** Transmit service ticket and display out of service notification | 10 |
| 124d E004 | 195: 120d | **Known Faulty operation 4:** Failure to print | (122d) **Known Remedy action 4:** Perform remote reset of the computing node | 65 |
| | 195: 120e | **Known Faulty operation 5:** Printer jam | (122e) **Known Remedy action 5:** Restart the computing node | 40 |
| | 195: 120f | **Known Faulty operation 6:** Out of paper | (122f) **Known Remedy action 6:** Transmit service ticket and display out of service notification | 30 |

*FIG. 2C*

Rules dataset 146

| No. | Computing node parameters 126b-126n | Rules 152 | Set of procedures 150 | Sequential order (188) | Number of successful fixes (184) |
|---|---|---|---|---|---|
| 1 | Timestamp (T1) of the last registered maintenance (126d) | 152a: If a time period from when the timestamp T1 is received does not exceed a first threshold value (TV1) (154) | 156a: **First Potential Faulty operation:** Keypad registering incorrect input because software version is not updated and may have bugs<br>158a: **First Potential Remedy action:** Identifying lowest latency neighboring computing node to request software program update | 1 | 50 |
| | | | 156b: **Second Potential Faulty operation:** Tampering event<br>158b: **Second Potential Remedy action:** Check for unexpected fluctuation of electrical signals casued by one or more components and shutdown the computing node | 2 | 25 |
| | | | 156c: **Third Potential Faulty operation:** Keypad not responding<br>158c: **Third Potential Remedy action:** Transmit service ticket and display out of service notification | 3 | 10 |
| | | 152b: If a time period from when the timestamp T1 is received exceeds first threshold value (TV1) (160) | 162a: **First Potential Faulty operation:** Cannot connect to network server<br>164a: **First Potential Remedy action:** Reset network settings | 1 | 40 |
| | | | 162b: **Second Potential Faulty operation:** Keypad not responding<br>164b: **Second Potential Remedy action:** Transmit service ticket and display out of service notification | 2 | 20 |

*FIG. 2D*

Rules dataset 146

184

| No. | Computing node parameters 126b-126n | Rules 152 | Set of procedures 150 | Sequential order | Number of successful fixes |
|---|---|---|---|---|---|
| 2 | 126d Timestamp (T1) of the last registered manintenance AND Event type: Keypad error 126e | If a time period from when the timestamp T1 is received does not exceed a first threshold value (TV1) and is associated with "Keypad error" 152c | 155 **First Potential Faulty operation:** Keypad registering incorrect input because new software version update installed is incompatible **First Potential Remedy action:** Identifying lowest latency neighboring computing node to request software program update | 1 | 50 |
| | | | **Third Potential Faulty operation:** Keypad not responding **Third Potential Remedy action:** Transmit service ticket and display out of service notification | 3 | 10 |
| | | If a time period from when the timestamp T1 is received exceeds first threshold value (TV1) and is associated with "Keypad error" 152d | 161 **Second Potential Faulty operation:** Keypad not responding **Second Potential Remedy action:** Transmit service ticket and display out of service notification | 2 | 20 |

*FIG. 2E*

| Historical computing node events dataset 186 | |
|---|---|
| **Computing node identifier** | **Historical faulty operations 120** |
| CN_1 | **Faulty operation 1:** Failure to print<br>**Remedy action 1:** Perform remote reset of the computing node |
| CN_12 | **Faulty operation 2:** Printer jam<br>**Remedy action 2:** Check printer paper box for jam computing node |
| CN_12345 (186a) | **Faulty operation 3:** Out of Paper<br>**Remedy action 3:** Refill paper |
| CN_12345 (186b) | **Faulty operation 4:** Keypad not responding<br>**Remedy action 4:** Check for power supply failure |
| CN_3 | **Faulty operation 5:** Keypad registering incorrect input |

*FIG. 2F*

400b 400a Standardized location dataset 150

| Computing node identifier | Resource Status indicator | Service Provider Vehicle identifier | Node location Standardized data value | Vehicle location Standardized data value | Vehicle distance from computing node |
|---|---|---|---|---|---|
| CN_02 | Warning | VN_1 | SDN | SD1 | D1: 300 meters |
| CN_02 | Warning | VN_2 | SDN | SD2 | D2: 500 meters |
| CN_02 | Warning | VN_3 | SDN | SD3 | D3: 750 meters |
| | | ⋮ | | | |

SYSTEM AND METHOD FOR DETECTING AND REMEDYING FAULTY FAILOVER OF EDGE NETWORK COMPUTING DEVICES BASED ON MONITORED SENSOR DATA

TECHNICAL FIELD

The present disclosure relates generally to network and device monitoring and, more specifically, to a system and method for detecting and remedying faulty failover of edge network computing devices based on monitored sensor data.

BACKGROUND

A network of computing nodes that are in communication form a complex network, particularly when resources utilized at each computing node are critical to the operations performed by the individual computing nodes and the overall network. Operations associated with the resources may fail when resources at an affected computing node are not functioning at a required operational level, resulting in faulty or malfunctioning operations. Some of the technical challenges that occur when resources at the affected computing node are not functioning at a required operational level are, for example, under-utilization of the affected computing node, resulting in reduced computing system performance. In another example, it may even cause the computing node to be offline and thus unavailable to provide its network services. In some cases, the disruption of network operations across computing nodes of a computing network is often associated with unnecessary data redundancy and thus reduces the overall network performance. Existing systems may rely on reports from users experiencing issues with services associated with faulty operations to detect issues with the computing node.

SUMMARY

The disclosed system, described in the present disclosure, is particularly integrated into a practical application for detecting and remedying faulty operations associated with computing nodes based on monitored sensor data associated with the computing node.

Detecting and Remedying Faulty Failover of Edge Network Computing Devices Based on Monitored Sensor Data The system and method implemented by the system as disclosed in the present disclosure provide technical solutions to the technical problems discussed above by intelligently detecting an anomalous operation (i.e., a faulty operation) associated with a computing node and remedying the anomalous operation to resolve the malfunction associated with the anomalous operation. Further, the system identifies a sequential order of executing remedy actions to fix the anomalous operation.

Current technologies are not configured to provide a reliable and efficient solution for detecting anomalous operations in computing nodes. In current approaches, several anomalous operations can occur in a computing node (e.g., automated teller machines (ATMs)) that can adversely affect the ATMs' performance. It is challenging to monitor ATMs for anomalous operations (faulty operations) because of the complex network of ATMs. ATM networks are complex networks because each ATM could be associated with a different vendor company that manufactures the ATM with its own vendor-specific hardware configurations and software configurations, which may result in each ATM having its own unique faulty operations. Some of the technical challenges that occur when software components (software programs) of an ATM are not functioning at a required operational level, for example, because of a lack of software maintenance (i.e., outdated software programs or no updates of software programs) associated with a software program deployed at the ATM. The outdated software program may not be compatible with a first ATM from a first vendor company but would be compatible with a second type of ATM from a second vendor company. This results in, for example, under-utilization of the affected first ATM, resulting in reduced performance of the ATM. Another example is that it may even cause multiple ATMs to shut down/go offline and thus be unavailable to provide their services, resulting in disruption of network operations across ATMs of a network. In some cases, the disruption of network operations across ATMs of a network is often associated with unnecessary data redundancy and thus reduces the overall network performance. Other examples of technical challenges may include failure to detect faulty operations associated with hardware components (e.g., tampering events) of an ATM. For example, tampering events may include the addition of malicious components within the ATM, a disconnected wire of a cash dispenser, or a circuit break because of a damaged wire connection of a keypad of an ATM.

Current approaches suffer from several drawbacks in detecting faulty operations at an ATM. For example, to detect faulty operations, current approaches rely on a user reporting issues in response to experiencing faulty operations while interacting with an ATM. Further, in current approaches, ATMs are troubleshooted manually for anomalies or faulty operations. This disclosure recognizes that previous technologies fail to effectively detect and remedy anomalous and/or faulty operations in ATMs.

Embodiments of the present disclosure provide several practical applications and technical advantages that provide solutions to the problems discussed above in relation to conventional computing systems and networks. A computing node may be configured to generate a fault event message in response to detecting an anomalous operation at the computing node. The fault event message includes a fault event identifier, which is representative of the nature of the anomalous operation (i.e., malfunction or a faulty operation) that occurred at the computing node. The fault event identifier may be an unknown fault event identifier or a known fault event identifier.

Receive a Fault Event Message and Determine an Unknown Fault Event Identifier

The system receives the fault event message including the fault event identifier and one or more computing node parameters from the computing node. Computing node parameters include parameters that provide information associated with the anomalous operation taking place at the computing node. For example, computing node parameters may include a computing node identifier associated with the computing node, a geolocation of the computing node, a timestamp (T1) of the last registered maintenance performed on the computing node, an event type, and/or timestamp (T2) of the anomalous operation.

Upon receiving the fault event message, the system accesses a historical events dataset that is configured with a list of known fault event identifiers to determine if the received fault event identifier is an unknown fault event identifier or a known fault event identifier. When the system determines that the received fault event identifier is not included in the list of known fault event identifiers, then the fault event identifier is determined as an unknown fault event identifier. When the system determines that the received fault event identifier is included in the list of known fault event identifiers, then the fault event identifier is determined as a known fault event identifier.

Execute Artificial Intelligence Algorithm

Upon determining that the fault event identifier is an unknown fault event identifier, then the system executes an artificial intelligence (AI) algorithm to determine a first set of procedures utilized to remedy the anomalous operation based on the computing node parameters. The AI algorithm is trained on a rules dataset that includes a plurality of rules to identify the set of procedures. For example, the AI algorithm is trained on a first rule that defines identifying the first set of procedures when a data value associated with the computing node parameters does not exceed a first predefined threshold value. For example, when the computing node parameter is a timestamp (T1) of the last registered software maintenance performed on the computing node, e.g., T1 is “2024-12-18 T15:45:00” (i.e., data value). Accordingly, the first rule defines the predefined threshold value TV1 as a date and time, e.g., “2025-01-01 T10:00:00”, that is compared with the data and time T1.

Based on this comparison, if T1 does not exceed TV1, then the AI algorithm identifies the first set of procedures to be associated with identifying and remedying the anomalous operation. The first set of procedures includes a first potential faulty operation and a first potential remedy action, a second potential faulty operation and a second potential remedy action, and a third potential faulty operation and a third potential remedy action.

Identify Sequential Order of Execution

The system then determines a sequential order of executing the identified remedy actions included in the first set of procedures based on a plurality of execution criteria stored in the historical events dataset. The plurality of execution criteria may include, for example, a past number of successful fixes associated with each of the remedy actions included in the first set of procedures, a type of component (hardware or software) included in the event type, or a combination thereof. Other criteria associated with the execution of the first set of procedures may also be included as part of the plurality of execution criteria.

For example, based on the determined past number of successful fixes associated with each of the potential remedy actions, the server device determines a sequential order of executing the identified potential remedy actions. The sequential order of execution may be a descending order or an ascending order of the past number of successful fixes associated with each of the potential remedy actions. For example, the sequential order may be based on a descending order of the past number of successful fixes, such that the first potential remedy action would be executed first, followed by the second potential remedy action, and the third potential remedy action would be executed last.

By identifying a sequential order of execution of the remedy actions based on tracking the past number of successful fixes associated with the remedy actions, the system is able to detect trends (e.g., the highest past number of successful fixes associated with a remedy action) across the network of computing nodes. Based on these trends the system may first execute a remedy action associated with the highest past number of successful fixes because its execution may result in a high likelihood of remedying the anomalous operation. Thus, the system provides faster remedy response times and minimizes under-utilization of the affected computing node as well as the downtime (i.e., going offline) associated with the affected computing node. This further reduces the extra workload required to identify remedy actions multiple times when a remedy action does not fix the anomalous operation and thus improves overall network performance.

Sequentially Execute the Potential Remedy Actions

The computing node where the anomalous operation takes place is also referred to as a malfunctioning computing node. The first potential faulty operation, for example, is “Keypad registering incorrect input because software version is not updated and may have bugs”. Here, the system determines that the malfunctioning computing node includes a software program (SP) that is not updated. Further, the system determines that SP needs to be updated to an updated software program (USP) released after the TV1 time to fix the anomalous operation. The USP includes updates to fix bugs in the SP (also referred to as outdated software program). The first potential remedy action identified is, for example, “Identifying lowest latency neighboring computing node to request software program update.” Accordingly, the first potential remedy action is to identify the geographically closest computing node (that stores the USP) to the malfunctioning computing node.

In this context, the system may have access to a node list that includes information about the software programs installed at each of the computing nodes in the network and the geographical location of each of the computing nodes. The system searches the node list and identifies a computing node that includes the USP and is the closest to the malfunctioning computing node where the anomalous operation takes place. Essentially, the system identifies the computing node with the USP that has the lowest latency communication path to the malfunctioning computing node, including the SP. The assumption here is that the computing node that is geographically nearest to the malfunctioning computing node most likely has the lowest latency communication path to the malfunctioning computing node. Next, upon identifying the computing node that is the closest neighbor to the malfunctioning computing node, the system transmits a transfer command to the computing node for transferring program files (e.g., USP) to the malfunctioning computing node over a peer-to-peer connection. The idea here is that peer-to-peer connection provides the lowest latency communication path between the computing nodes. Thus, transmitting the USP to the malfunctioning computing node over the peer-to-peer connection is most likely the fastest method to get the USP to the malfunctioning computing node. This generally results in a faster install of the USP at the malfunctioning computing node, causing a faster remedy of the computing node from the anomalous operation, thus reducing any downtime associated with the malfunctioning computing node.

As such, the disclosed systems may improve the current technologies by detecting anomalous operations because of an outdated software program and remedying the anomalous operation by installing an updated software program. As described in embodiments of the disclosure, the described system and method identifies the computing node that has the lowest latency communication path to the malfunctioning computing node where the anomalous operation takes place and commands the computing node to transmit program files related to the updated software program over a peer-to-peer connection to the malfunctioning computing node. This reduces latency associated with resolving the malfunction and, in turn, reduces any downtime relating to the malfunctioning computing node caused by the anomalous operation or malfunction. Further, reducing downtime relating to the malfunctioning computing node caused by the anomalous operation improves the performance of the malfunctioning computing node. In addition, having the nearest computing node transmit program files (e.g., USP) to the malfunctioning computing node saves network resources (e.g., network bandwidth), which would otherwise be used to transmit program files of USP to the malfunctioning computing node from a faraway computing node. Thus, unlike conventional systems that rely on a user reporting issues in response to faulty operations associated with software programs while utilizing an ATM, the disclosed system and methods are able to identify and implement remedy actions that stop damage or further damage from occurring because of faulty operations.

Sequentially Execute the Potential Remedy Actions

When it is determined that the first potential remedy action does not successfully fix the anomalous operation, then the system executes the second potential remedy action. The second potential remedy action identified is, for example, "Check for unexpected fluctuation of electrical signals caused by one or more components." Accordingly, the remedy action is to remotely check for unexpected fluctuation of electrical signals generated within components of the computing node. The computing node includes several hardware components that perform its operation. For example, the computing node is an ATM. For example, an ATM includes several components such as include circuit boards, wire cables, memory components, microchips, cash dispensers, cassettes (for storing bill notes), user interfaces (e.g., display screen, keypads, etc.), among any other component that any ATM includes. Further, each computing node includes a sensor S1 to Sn, respectively. Sensors S1 to Sn are electromagnetic (EM) sensors that are configured to detect EM radiation signals propagated from the electrical components.

For example, assume that there are ten components in the ATM. Thus, the sensor S1 captures the EM radiations from each of the ten components and determines the frequency associated with each of the ten components. For example, the sensor S1 determines that a first frequency (e.g., 120 KHz) is associated with a first component, a second frequency (e.g., 130 KHz) is associated with a second component, and so on. For example, if the system determines that the faulty operation is a tampering event at the ATM, then system transmits a request to the sensor S1 to transmit the frequency information associated with all the components at the ATM. In response to receiving all the frequency information, system may detect an eleventh frequency that is different from the known frequencies associated with the ten components of the computing node. Thus, the system determines that a new unknown component, has been added to ATM and in response, shuts down the computing node as part of remedying the anomalous operation.

Thus, unlike conventional systems that fail to detect faulty operations associated with hardware components (e.g., tampering events) and rely on a user reporting issues in response to faulty operations associated with hardware components while utilizing an ATM, the disclosed system and methods are able to identify and implement remedy actions that stop damage or further damage from occurring because of faulty operations. As such, the disclosed systems may improve the current technologies by analyzing wired and wireless communications of electrical components of the ATMs and other computing devices. The disclosed system learns the unique electrical and EM radiation signal frequency patterns of each component of an ATM. Thus, the disclosed system detects any unexpected fluctuation in the electrical and/or EM radiation signal of a component and determines a particular anomaly caused by the fluctuation (e.g., caused by a tampering event such as the addition of a malicious component, a new and/or unverified component). Accordingly, the disclosed system may be integrated into a practical application of securing data stored in ATMs and other computing devices from unauthorized access, and thus, from data exfiltration, modification, destruction, and the like. This, in turn, provides an additional practical application of securing computer systems and servers that are tasked to oversee operations of the ATMs and other computing devices from unauthorized access as well. The disclosed system may be integrated into an additional practical application of improving underlying operations of the ATMs and other computing devices. For example, the disclosed system may decrease processing, memory, and time resources spent in securing data stored in the ATMs and other computing devices that would otherwise be spent using the existing information security technologies.

In some embodiments, a system detecting an anomalous operation associated with a computing node and remedying the anomalous operation to resolve the malfunction associated with the anomalous operation comprises a memory operable to store an artificial intelligence (AI) algorithm and a historical events dataset and a rules dataset. The historical events dataset comprises known fault event identifiers and a plurality of execution criteria. The rules dataset includes one or more rules to identify a first set of procedures to fix an anomalous operation associated with a computing node. The processor is operably coupled to the memory and configured to receive a fault event message from a computing node. The fault event message comprises a fault event identifier and one or more computing node parameters. The fault event identifier is associated with an anomalous operation performed by the computing node. The processor determines whether the received fault event identifier is a known fault event identifier based at least in part upon determining if the received fault event identifier is included in a list of known fault event identifiers stored in the historical events dataset. In response to determining that the received fault event identifier is not a known fault event identifier, the processor executes the AI algorithm to identify a first set of procedures based at least in part on a data value associated with the one or more computing node parameters not exceeding a predefined threshold value. The first set of procedures includes a first potential faulty operation and a corresponding first potential remedy action, and a second potential faulty operation and a corresponding second potential remedy action. The AI algorithm is trained based on the rules dataset that includes one or more rules to identify the first set of procedures. One of the rules defines identifying the first set of procedures when the data value associated with the one or more computing node parameters does not exceed a predefined threshold value. Further, the processor identifies a sequential order of execution of the identified first potential remedy action and the second potential remedy action based on at least one of a plurality of execution criteria stored in the historical events dataset. The one of the plurality of execution criteria includes past number of successful fix data associated each of the first potential remedy action and the second potential remedy action. The identified sequential order first executes the first potential remedy action, followed by the second potential remedy action. The processor sequentially executes the first potential remedy action on the computing node and determines whether the executed first potential remedy action fixes the anomalous operation associated with the computing node. In response to determining that the executed first potential remedy action does not fix the anomalous operation associated with the computing node, sequentially execute, on the computing node, the second potential remedy action, the processor determines whether the executed second potential remedy action fixes the anomalous operation associated with the computing node. In response to determining that the executed second potential remedy action does fix the anomalous operation associated with the computing node, transmit a successful fix notification to the computing node, the processor inputs the received fault event identifier and the identified second potential faulty operation and the corresponding second potential remedy action in the historical events dataset to update the historical events dataset.

Location-Based Monitoring of Computing Node Parameters Based on Sensor Data

The system and method implemented by the system, as disclosed in the present disclosure, provide technical solutions to the above-discussed technical problems associated with a computing node when operations associated with a resource of the computing node are not functioning at the required operational level by providing a location-based system for monitoring of computing node parameters based on sensor data. Further, the system transforms data from different formats into a standardized format to identify a service provider vehicle closest to an affected computing node that provides services to remedy issues associated with the resource of the computing node.

Current technologies are not configured to provide a reliable and efficient solution for detecting computing node resources that are not functioning at the required operational level. For example, computing nodes may be automated teller machines (ATMs), and the resources associated with the ATMs may include backup power, software programs, currency notes, etc. In current approaches, several resources of an ATM may not function at the required operational level, which can adversely affect the ATM's performance. It is challenging to monitor an ATM's resources because of the complex network of ATMs. Some of the technical challenges that occur when resources of the computing node are not functioning at the required operational level, for example, when an ATM resource is a backup battery supplying backup power to an ATM in a power outage situation. When backup power is below the required operational level, it may result in an insufficient power supply to operate the ATM. This may cause the ATM to shut down or go offline and thus be unavailable to provide services. This results in, for example, under-utilization of the affected ATM, resulting in reduced performance of the ATM. In a situation where multiple ATMs may go offline because of insufficient backup power, it may result in disruption of network operations across ATMs of a network. In some cases, the disruption of network operations across ATMs of a network is often associated with unnecessary data redundancy and thus reduces the overall network performance.

In another example, an ATM resource is a software component (software programs) of an ATM that is not functioning at a required operational level, for example, because of a lack of software maintenance (i.e., outdated software programs or no updates of software programs) of a software program deployed at the ATM such that the software program has not been updated since a threshold time period. This results in, for example, under-utilization of the ATM, resulting in reduced performance of the ATM. In certain cases, it may also lead to the ATM's software program crashing, thus causing the ATM to be out of service.

In another example, when the ATM resource is currency notes (or cash) stored at the ATM, and the cash at the ATM is below the required operational level, for example, when the ATM is low on currency notes (or cash), then the ATM would be unable to perform its primary operation of providing or dispensing cash. Accordingly, when the ATM runs out of cash, it is effectively unavailable or out of service until the cash at the ATM is replenished. When multiple ATMs go out of service, this results in increased downtime that further generates inaccurate ATM network resource usage patterns, which results in inaccurate network resource allocation. For example, if an ATM is located in a high-user interaction neighborhood, where ATM cash is withdrawn at a very high rate. In this situation, the ATM may be allocated higher network bandwidth to provide uninterrupted services to the users interacting with the ATM; however, when the ATM runs out of cash, the ATM goes out of service (i.e., the ATM is idle for long duration of time), resulting in underutilization of the allocated network bandwidth. Further, this may result in an inaccurate usage pattern indicating that the ATM does not require higher bandwidth as the ATM is idle for long durations, resulting in incorrectly downgrading the resource allocation from higher bandwidth to lower bandwidth and thus creating network bottlenecks.

Current approaches suffer from several drawbacks in computing node resources that are not functioning at the required operational level. For example, current approaches rely on a user reporting an issue when experiencing resources not functioning while interacting with an affected ATM. In response to the user reporting the issue, a service provider vehicle (associated with a technician) who manually services/addresses these issues is notified. Accordingly, the service provider vehicle is not notified until after a user reports the issue. Thus, current approaches are directed toward retroactively servicing issues at the affected ATM.

In the current approach, service provider vehicles utilized to service the affected ATM manually are compatible with only a single data file format. Further, current approaches are not compatible with utilizing multiple data file formats transmitted by multiple service provider vehicles to service an affected ATM manually. One of the technical challenges that occur when utilizing multiple service provider vehicles from multiple vendors is that each service provider vehicle could be associated with a different vendor company that utilizes its own specific data file format. This may result in each service provider vehicle having its own data file format, such that each data file format is incompatible with the other. For example, a first service provider vehicle associated with a first vendor company transmitting information with a first data file format may be located near an affected ATM that requires services. However, in the current approach, when the first service provider vehicle is unavailable or cannot service the affected ATM, current approaches would wait until the first service provider vehicle becomes available. This results in extended downtime to provide manual services to an affected ATM. Another example is when multiple ATMs go offline and need services from service provider vehicles, which may result in disruption of network operations across ATMs. In some cases, the disruption of network operations across ATMs of a network is often associated with unnecessary data redundancy and thus reduces the overall network performance.

Embodiments of the present disclosure provide several practical applications and technical advantages that provide solutions to the problems discussed above in relation to conventional computing systems and networks.

Receive a Resource Status Message and Determine if it Includes a Warning Status (FIG. 4)

A computing node (e.g., an ATM) may be configured with sensors (S2) to generate a resource status message in response to detecting that a resource at ATM is not functioning at the required operational level. The resource status message includes a resource status indicator, which is representative of the status of the resource (i.e., a data value of the resource is below a threshold value) at the ATM and a node location identifier. For example, the resources may include one or more components. Further, the resources may include an external backup power battery, an internal backup power battery, a software program (e.g., an outdated software version of the software program), or an updated software program (e.g., an updated version of the software program), currency notes stored at the ATM, printer paper, etc.

The resource status indicator indicates a status information associated with a resource of the ATM. Accordingly, the resource status indicator may indicate a data value associated with currency notes (amount of funds available or cash available) stored at the ATM. Thus, the resource status indicator may indicate that the amount of funds available at the ATM is below a threshold value of funds required at the ATM. When the amount of funds available at the ATM is below a threshold value then the ATM is determined to be low on funds or low on cash and the resource status indicator includes a warning status.

Further, the node location identifier indicates the geographical location of the ATM and is represented as a software code in a first format (F1) associated with the resource status message.

For example, the node location identifier represents the geographical location of ATM as a software code embedded within the resource status message.

Upon receiving the resource status message, server device determines if the resource status indicator includes a warning status. For example, when the resource status indicator indicates that the amount of funds (available cash) available at ATM has gone below a threshold value, then it is determined that the resource status indicator is a warning status. The warning status indicates that a data value associated with a resource of ATM is below a threshold value.

Transmit a Location Request and Receive First and Second Vehicle Location Messages (FIGS. 5A-5B)

In response to determining that the resource status indicator includes a warning status, server device transmits a location request (LR1), via the network, to a plurality of service provider vehicles included in the vehicle edge network. The location request (LR1) may be a broadcast message sent to each of the plurality of service provider vehicles, requesting location information of the plurality of service provider vehicles. The plurality of service provider vehicles provides services to remedy the warning status associated with the resource of the ATM. In this embodiment, server device transmits the location request (LR1) to a first service provider vehicle and a second service provider vehicle.

In response to transmitting the location request (LR1) to the first service provider vehicle, server device receives a first vehicle location message in a second format from the first service provider vehicle. With reference to FIG. 5A, the first vehicle location message 502 includes a first vehicle identifier, a format identifier, vehicle resource data value, and the first vehicle location identifier of the first service provider vehicle.

In response to transmitting the location request (LR1) to the second service provider vehicle, server device receives a second vehicle location message in a third format from the second service provider vehicle. With reference to FIG. 5B, the second vehicle location message 504 includes a second vehicle identifier, a format identifier, vehicle resource data value, and the second vehicle location identifier of the second service provider vehicle.

The second format (F2) and the third format (F3) are different formats, and each of the second format (F2) and the third format (F3) are incompatible with the first format (F1) of the resource status message. For example, the first format (F1) is an eXtensible Markup Language (XML) file format, the second format (F2) is an JavaScript Object Notation (JSON) file format, and the third format (F3) is an Yet Another Markup Language (YAML) file format.

Generate Standardized Data Values (FIG. 5C)

The system further transforms the geolocation information included in the node location identifier associated with the ATM included in the resource status message of a first format to generate a node location standardized data value SDN (e.g., SDN is 123 Main Street, New York, NY 00001, USA) corresponding with the node location identifier of the computing node. The system is configured to generate the first standardized data value (SDN) corresponding to geolocation information of the ATM included in the node location identifier by utilizing an AI algorithm (e.g., a Naïve Bayes classification algorithm or any other artificial intelligence algorithm) that is trained to extract geographical coordinate location included within the resource status message for a first format. The AI algorithm is trained using two sets of training data. The first set of training data utilized to train the AI algorithm includes a labeled dataset of geographical coordinate location in the first format and the second set of training data includes plain text data representing the geographical coordinate location. The AI algorithm is thus trained to distinguish and identify the geographical coordinate locations in the first format from plain text data representing the geographical coordinate location based on the two sets of training data.

Similar to transforming the geolocation information associated with the node location identifier associated with the ATM to generate the node location standardized data value SDN, the system executes the AI algorithm to transform the geolocation information associated with the first vehicle location identifier included in the first vehicle location message in a second format to generate a first vehicle location standardized data value, SD1 (e.g., SD1 is 567 C Street, New York, NY 00005, USA). Additionally, the system executes the AI algorithm to transform the geolocation information associated with the second vehicle location identifier included in the second vehicle location message in a third format to generate a second vehicle location standardized data value, SD3 (e.g., SD2 is 8910 F Street, New York, NY 00009, USA).

Generate Standardized Location Dataset (FIG. 6)

The system then generates the standardized location dataset, including the node location standardized data value, SDN, the first vehicle location standardized data value, SD1, and the second vehicle location standardized data value, SD2. The standardized location dataset represents a table including an identifier of the ATM (i.e., CN_02), an identifier associated with the first service provider vehicle (e.g., VN_1), and the second provider vehicle (e.g., VN_2), and the node location standardized data value SDN, first vehicle location standardized data value SD1, the second vehicle location standardized data value SD2.

The system executes an AI algorithm (e.g., an Table OCR algorithm) with the standardized location dataset as input in order to determine the first vehicle location standardized data value SD1 associated with the first vehicle location identifier VN_1, and the second vehicle location standardized data value SD2 associated with the second vehicle location identifier VN_2. The Table OCR algorithm is trained to recognize data from the standardized location dataset based on two sets of training datasets. The first training dataset utilized to train the Table OCR algorithm includes a tabular digital representation of characters of the data (e.g., a tabular dataset with alphabetical characters, numerical characters included within a tabular dataset), and the second training dataset includes plain text of alphabets and numbers. the Table OCR algorithm thus is trained to recognize characters of data from the standardized location dataset.

Determine a First Distance and a Second Distance Based on Comparison

The system then compares the first vehicle location standardized data value SD1 (e.g., SD1 is 567 C Street, New York, NY 00005, USA) associated with the first service provider vehicle with the node location standardized data value SDN (e.g., SDN is 123 Main Street, New York, NY 00001, USA) to determine a first distance D1 (e.g., 300 meters). The first distance, D1, represents the distance between the first service provider vehicle and the ATM. The system similarly determines the second distance, D2, which represents the distance between the second service provider vehicle and the ATM.

The system then compares the first distance, D1, and the second distance, D2, to determine the shortest distance to the ATM. Based on comparing the first distance (e.g., 300 meters) associated with the first vehicle location standardized data value "SD1" corresponding with the first vehicle provider vehicle and the second distance (e.g., 500 meters) associated with the second vehicle location standardized data value "SD2" corresponding with the second vehicle provider vehicle, the system identifies the first distance (e.g., 300 meters is shorter than 500 meters) associated with the first service provider vehicle as the shortest distance to the computing node.

Transmit a Remedy Task Notification

The system then transmits a remedy task notification to the first service provider vehicle identified to have the shortest distance to the computing node. The remedy task notification identifies services to remedy the warning status (e.g., low backup power, outdated software or low cash) by manually servicing the ATM with the required resources.

Thus, by proactively detecting ATM resources that are not functioning at the required operational level and identifying the closest service provider vehicle to provide services to the affected ATM, the system provides technical advantages of reducing downtime of an ATM and minimizes under-utilization of the affected ATM. This further reduces the extra workload required to incorrectly downgrade allocated network resources from higher bandwidth to lower bandwidth thus reducing network bottlenecks. Additionally, by standardizing data from multiple file formats, the system can identify service provider vehicles from multiple locations and multiple vendors, thus providing faster remedy response times and reducing downtime (i.e., going offline) of an affected ATM and thus avoiding disruption of network operations across ATMs of a network. By avoiding disruption of network operations, this avoids unnecessary data redundancy and thus continues to provide required network performance.

In some embodiments, a system for location-based monitoring of computing node parameters based on sensor data comprises a memory operable to store an artificial intelligence and a standardized location dataset table. The standardized location dataset table stores a node location identifier of a computing node, a first vehicle location identifier of a first service provider vehicle, and a second vehicle location identifier of a second service provider vehicle. A processor operably coupled to the memory and configured to electronically receive, from a computing node, a resource status message in a first format. The resource status message comprises a resource status indicator, a first format identifier, and a node location identifier of the computing node. The resource status indicator indicates a status information of a resource of the computing node. The processor determines if the resource status indicator includes a warning status and the warning status indicates that a data value associated with a resource of the computing node is below a threshold value. The processor in response to determining that the resource status indicator includes a warning status, electronically transmits a location request to a plurality of service provider vehicles requesting location information of the plurality of service provider vehicles. The plurality of service provider vehicles provides services to remedy the warning status associated with the resource of the computing node. The plurality of service provider vehicles includes a first service provider vehicle and a second service provider vehicle. The processor in response to transmitting the location request electronically receive a first vehicle location message in a second format from the first service provider vehicle. The first vehicle location message comprises a first vehicle identifier, a second format identifier, and the first vehicle location identifier of the first service provider vehicle. The processor electronically receives a second vehicle location message in a third format from the second service provider vehicle. The second vehicle location message comprises a second vehicle identifier, a third format identifier, and the second vehicle location identifier of the second service provider vehicle. The second format and the third format are different formats, and wherein each of the second format and the third format are incompatible with the first format of the resource status message. The processor transforms the node location identifier from the resource status message in the first format into a node location standardized data value and transforms the first vehicle location identifier from the first vehicle location message in the second format into a first vehicle location standardized data value, and further transforms the second vehicle location identifier from the second vehicle location message in the third format into a second vehicle location standardized data value. The processor generates the standardized location dataset table, including the node location standardized data value, the first vehicle location standardized data value, and the second vehicle location standardized data value and collects a set of documents from a database, wherein each document of the set of documents includes one or more table structures. The processor applies one or more annotations to the one or more table structures included in each document of the set of documents to create a modified set of documents, wherein the one or more annotations indicate one or more elements of the one or more table structures and text included within the one or more elements and wherein the one or more elements include individual cells associated with the one or more table structures, rows associated with the one or more table structures, columns associated with the one or more table structures, and headers associated with the one or more table structures. The processor creates a first training set comprising the collected set of documents, the modified set of documents, and a set of documents including non-table content, wherein the non-table content includes text paragraphs and images. The processor trains the AI algorithm in a first stage using the first training set to detect one or more elements of the one or more table structures and to recognize and extract text from individual cells in the one or more table structures. The processor creates a second training set for a second stage of training comprising the first training set and documents that are incorrectly detected to include text within the one or more table structures after the first stage of training. The processor retrains the AI algorithm in a second stage using the second training set, to generate a trained AL algorithm. The processor executes the trained AI algorithm with the standardized location dataset table as input in order to determine the node location standardized data value associated with the node location identifier, the first vehicle location standardized data value associated with the first vehicle location identifier, and the second vehicle location standardized data value associated with the second vehicle location identifier The trained AI algorithm is trained to recognize text data from the standardized location dataset table, wherein the node location standardized data value, the first vehicle location standardized data value, and the second vehicle location standardized data value includes the recognized text data. The processor compares the node location standardized data value associated with the node location identifier and the first vehicle location standardized data value associated with the first vehicle location identifier to determine a first distance between the first service provider vehicle and the computing node. The processor compares the node location standardized data value associated with the node location identifier and the second vehicle location standardized data value associated with the second vehicle location identifier to determine a second distance between the second service provider vehicle and the computing node. The processor identifies the first distance between the first service provider vehicle and the computing node as a shortest distance to the computing node based on comparing the first distance and the second distance. The processor transmits a remedy task notification to the first service provider vehicle identified to have the shortest distance to the computing node a first time period, wherein the remedy task notification identifies services required to remedy the warning status. The processor in response to transmitting the remedy task notification to the identified first service provider vehicle at the first time period, determine if the first distance between the first service provider vehicle and the computing node has reduced by a threshold value at a second time period after the first time period. The processor in response to determining that the first distance between the first service provider vehicle and the computing node has reduced by the threshold value at the second time period after the first time period, transmit a service initiation signal to the computing node to place the computing node into a service mode as part of initiating a remedy operation to fix the warning status associated with the resource of the computing node.

Some embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 2C illustrates a historical events dataset, in accordance with one or more embodiments of the present disclosure;

FIGS. 2D-2E illustrates a rules dataset, in accordance with one or more embodiments of the present disclosure;

FIG. 2F illustrates a historical computing node events dataset, in accordance with one or more embodiments of the present disclosure;

FIG. 6 illustrates a standardized location dataset in accordance with one or more embodiments of the present disclosure.

DETAILED DESCRIPTION

Figure 1:
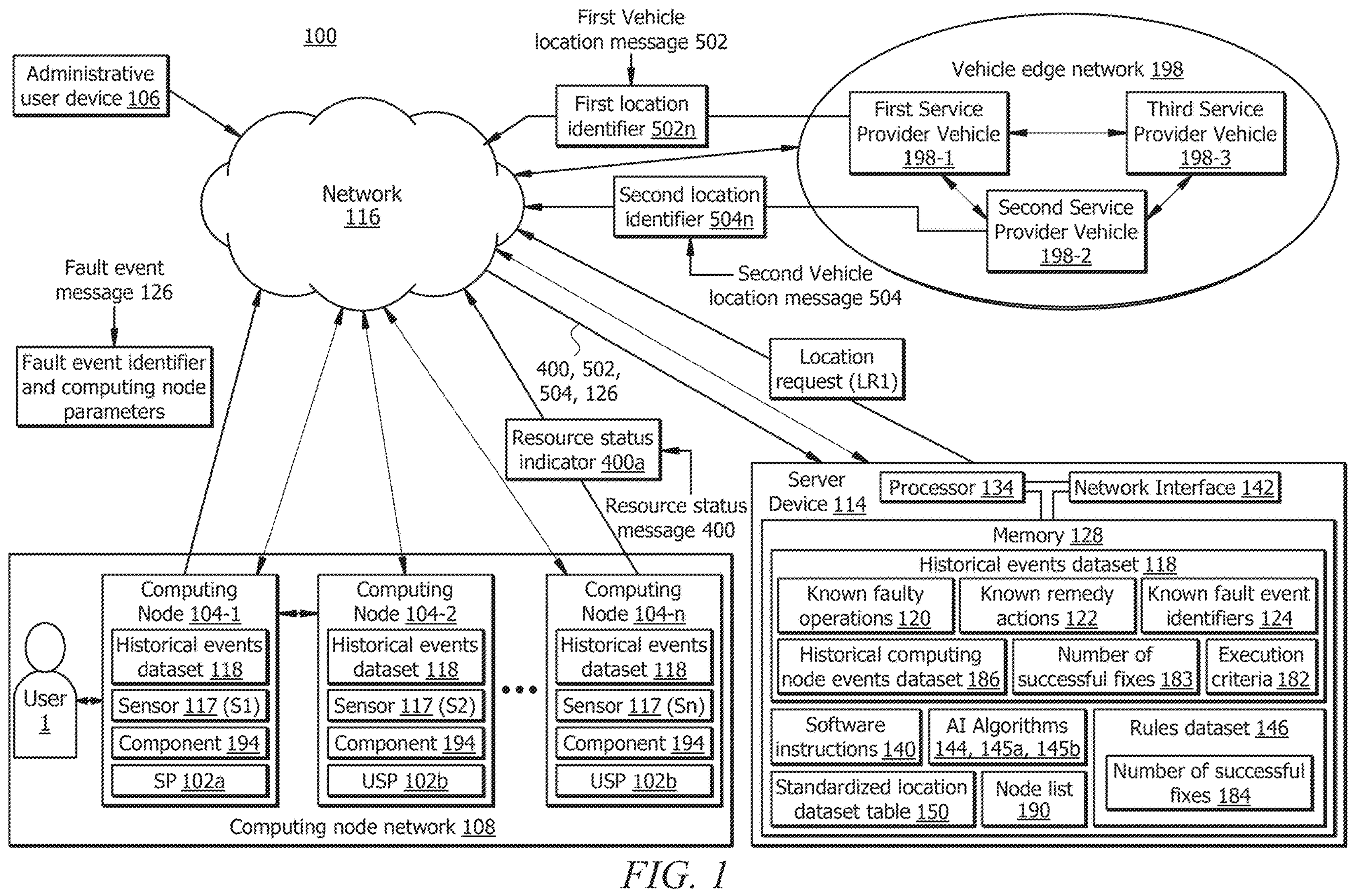
FIG. 1 is a schematic diagram of a system, in accordance with an embodiment of the present disclosure.

As described above, previous technologies fail to detect anomalous operations in a computing node. Embodiments of the present disclosure and its advantages may be understood by referring to FIGS. 1-3. FIGS. 1-3 are used to describe systems and methods for detecting an anomalous operation associated with a computing node and remedying the anomalous operation to resolve the malfunction associated with the anomalous operation, according to some embodiments.

System Overview

FIG. 1 is a schematic diagram of a system 100, in accordance with certain aspects of the present disclosure. As shown, system 100 includes computing nodes 104-1 to **104-*n*, an administrative user device 106, a server device 114, and a vehicle edge network 198 operably connected to one another via a network 116. Network 116 enables communication among the components of the system 100. The computing nodes 104-1 to 104-*n* are collectively referred to as computing nodes 104. The computing nodes 104-1 to 104-*n* may be interconnected to each other over the computing node network 108**.

In general, system 100 improves the detection of an anomalous operation (i.e., a faulty operation) associated with computing nodes 104 and remedies the anomalous operation to resolve the malfunction associated with the anomalous operation. Further, the system identifies a sequential order of executing the remedy actions to fix the anomalous operation.

System Components

Network

Network 116 may be any suitable type of wireless and/or wired network. The network 116 may be connected to the Internet or public network. Network 116 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., Wireless Fidelity (WiFi®), Wireless Gigabit (WiGig®), Worldwide Interoperability for Microwave Access (WiMAX®), etc.), a long-term evolution (LTE) network, a universal mobile telecommunications system (UMTS) network, a peer-to-peer (P2P) network, a Bluetooth® network, a near-field communication (NFC) network, and/or any other suitable network. The network 116 may be configured to support any suitable type of communication protocol, as would be appreciated by one of ordinary skills in the art.

Computing Nodes

System 100 includes one or more computing nodes 104 that are part of the computing node network 108. The example system of FIG. 1 illustrates computing nodes 104-1 to 104-*n* connected to the network 116. The computing node network 108 may include any suitable type of wireless and/or wired network as described with respect to network 116. In an embodiment the computing node network 108 may include an LPWAN (Low-Power Wide-Area Network) network. The LPWAN network covers large distances with low power consumption.

In one embodiment, as shown in FIG. 1, the computing nodes 104 are automated teller machines (ATMs). The one or more computing nodes 104 are interchangeably referred to as one or more ATMs 104. For example, the one or more ATMs 104 may comprise a terminal device for dispensing cash, tickets, scrip, travelers' checks, airline tickets, event tickets, other items of value, etc. Each ATM 104 (e.g., ATMs 104-1) is generally any automated dispensing device configured to dispense items when users interact with the ATM 104. In one embodiment, ATM 104-1, ATM 104-2, and ATM 104-*n* is an automated teller machine that allows users to withdraw cash, check balances, and make deposits interactively using, for example, a magnetically encoded card, a check, etc., among other services an ATM provides.

Software Components of Computing Nodes

Software components included in one or more computing nodes 104 (ATMs 104) may include one or more software programs (SP) 102*a* and updated software programs (USP) 102*b* that are run by one or more of the computing nodes 104 including, but not limited to, operating systems, user interface applications, web applications, third party software, database management software, service management software, metaverse software and other customized software programs implementing particular functionalities. The updated software program 102*b* is an updated version of the software program 102*a*. For example, software code relating to one or more software programs 102*a* may be stored in a memory device of the ATM 104-1, and one or more processors (not shown in the Figures) of the ATM 104-1 may process the software code to implement respective functionalities. For example, an ATM 104-1 may run several software programs 102*a*, including an operating system, firmware associated with chipsets controlling various hardware devices and components of the ATM such as a card reader, a cash dispenser, a PIN pad, a receipt printer, sensors etc., and a customized software package including customized software tools and applications that implement customized functionalities for an entity that owns the ATM. As shown in FIG. 1, computing node 104-1 runs a software program 102*a* (shown as SP 102*a*). Computing node 104-2 runs an updated software program 102*b* (USP 102*b*). Computing node 104-*n* also runs another copy of the updated software program 102*b* (USP 102*b*).

Hardware Components of Computing Nodes

With respect to the hardware components, each of the ATMs 104-1 to 104-*n* includes a plurality of sensors 117 (e.g., S1, S2, and Sn) and a plurality of components 194. For example, the ATM 104-1 may be configured as shown or in any other configurations. Each of the components 194 are generally electrical components of the ATM 104-1. For example, components 194 may include circuit boards, wire cables, memory components, microchips, cash dispenser, cassettes (for storing bill notes), user interfaces (e.g., display screen, keypads, etc.), among any other component that an ATM 104-1 may include. Sensor 117 (e.g., S1) is generally a sensor that is configured to detect EM radiation signals propagated from the electrical components 194. The sensor S1 may be configured to detect a broad range of frequencies, e.g., from 100 KHz to 5 MHz, or any frequency that a component 194 may propagate.

In certain embodiments, one or more of the computing nodes 104 may be operated by a user 1. For example, a computing node 104-1 may provide a user interface (e.g., web UI and/or metaverse UI) using which a user 1 may operate the computing node 104-1 to perform data interactions within the system 100. For example, user 1 may use a laptop computer to access a web application running on a web server, wherein both the laptop computer and the web server are part of the system 100. In another example, user 1 may interact with a graphical user interface displayed by a display monitor associated with an ATM to perform one or more interactions.

Administrative User Device

System 100 includes administrative user device 106 may generally be any device configured to process data. The administrative user device 106 may also include but are not limited to, a personal computer, a desktop computer, a workstation, a server, a laptop, a tablet computer, a mobile phone (such as a smartphone), an Internet-of-Things (IoT) device, a wearable computing device, smart glasses, smart watches or bracelets, phablets, other smart devices, devices configured for wired or wireless RF (Radio Frequency) communication, or any other suitable type of device. The administrative user device 106 may include a user interface, such as a display, a microphone, a camera, a keypad, or other appropriate equipment usable by a user. The administrative user device 106 may be utilized by an administrative user of the system 100 to perform operations or services to remedy anomalous operations (or faulty operations) associated with the computing nodes 104-1 to 104-*n*. Although the system 100 represents one administrative user device 106, a plurality of administrative user devices 106 may also be included.

Vehicle Edge Network

The vehicle edge network 198 includes a plurality of service provider vehicles 198-1 to 198-3. The plurality of service provider vehicles 198-1 to 198-3 include a first service provider vehicle 198-1, a second service provider vehicle 198-2, and a third service provider vehicle 198-3. However, any number of service provider vehicles may also be included. Service provider vehicles 198-1 to 198-3 provide services to manually remedy any anomalous operation or faulty operation detected at the computing nodes 104-1 to **104-*n*. The service provider vehicles 198-1 to 198-3 may include any vehicle, such as a car, a van, or a truck, although any other vehicle may also be included. Further, the service provider vehicles 198-1 to 198-3 are equipped with a computing device configured to process data. The computing devices included in the service provider vehicles 198-1 to 198-3 include but are not limited to, a personal computer, a desktop computer, a workstation, a server, a laptop, a tablet computer, a mobile phone (such as a smartphone), an Internet-of-Things (IoT) device, a wearable computing device, smart glasses, smart watches or bracelets, phablets, other smart devices, devices configured for wired or wireless RF (Radio Frequency) communication, global positioning system (GPS) device or any other suitable type of device. The computing device included in the service provider vehicles 198-1 to 198-3 includes a user interface, such as a display, a microphone, a camera, a keypad, or other appropriate equipment usable by a user of the service provider vehicles 198-1 to 198-3. The computing device of the service provider vehicles 198-1 to 198-3 utilizes the GPS device to transmit location information associated with the service provider vehicles 198-1 to 198-3. For example, the service provider vehicles 198-1 may transmit a first location message 502 including location information associated with the service provider vehicles 198-1**.

Server Device

The server device 114 includes a processor 134 in signal communication with a memory 128. Memory 128 stores software instructions 140, an artificial intelligence (AI) algorithm 144, a historical events dataset 118, a rules dataset 146, and a node list 190. Memory 128 stores software instructions 140 that when executed by processor 134, cause processor 134 to perform one or more operations of the server device 114 described herein. The operations performed by processor 134 generally include a hardware computer system that is configured to detect an anomalous operation associated with one or more computing nodes 104 and remedy the anomalous operation to resolve the malfunction associated with the anomalous operation. In some embodiments, the server device 114 may be implemented by a cluster of computing devices, such as virtual machines. For example, the server device 114 may be implemented by a plurality of computing devices using distributed computing and/or cloud computing systems in a network. In some embodiments, the server device 114 may be one or more servers in a server farm. In some embodiments, the server device 114 may include one or more servers in one or more data centers, data warehouses, and the like. The server device 114 may be an instance of one or more servers. In some embodiments, the server device 114 may be configured to provide services and resources (e.g., data and/or hardware resources) to the components of the system 100.

Network Interface

Network interface 142 is configured to enable wired and/or wireless communications. The network interface 142 may be configured to communicate data between the server device 114 and one or more computing nodes 104, and other systems, domains, or devices. For example, the network interface 142 may include an NFC interface, a Bluetooth® interface, a Zigbee® interface, a Z-wave® interface, a radio-frequency identification (RFID®) interface, a WIFI® interface, a local area network (LAN) interface, a wide area network (WAN) interface, a metropolitan area network (MAN) interface, a personal area network (PAN) interface, a wireless PAN (WPAN) interface, a modem, a switch, and/or a router. The processor 134 may be configured to send and receive data using the network interface 142. The network interface 142 may be configured to use any suitable type of communication protocol.

Processor

The server device 114 includes processor 134 that is operably coupled with memory 128 and network interface 142. Processor 134 includes one or more processors. Processor 134 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). For example, one or more processors may be implemented in cloud devices, servers, virtual machines, and the like. Processor 134 may be a programmable logic device, a microcontroller, a microprocessor, or any suitable number and combination of the preceding. The one or more processors are configured to process data and may be implemented in hardware or software. For example, the processor 134 may be 8-bit, 16-bit, 32-bit, 64-bit, or of any other suitable architecture. The processor 134 may include an arithmetic logic unit (ALU) for performing arithmetic and logic operations. The processor 134 may register the supply operands to the ALU and store the results of ALU operations. Processor 134 may further include a control unit that fetches instructions from memory and executes them by directing the coordinated operations of the ALU, registers, and other components. The one or more processors are configured to implement various software instructions. For example, the one or more processors are configured to execute instructions (e.g., software instructions 140) to perform the operations of the server device 114 described herein. In this way, processor 134 may be a special-purpose computer designed to implement the functions disclosed herein. In an embodiment, the processor 134 is implemented using logic units, FPGAs, ASICs, DSPs, or any other suitable hardware. The processor 134 is configured to operate as described in FIGS. 1-7. For example, processor 134 may be configured to perform one or more operations of the method 300, as described in FIG. 3. In another example, processor 134 may be configured to perform one or more operations of the operational flow 700, as described in FIG. 7. In some embodiments, the processor 134 executes software instructions 140 to perform one or more operations associated with detecting an anomalous operation associated with one or more computing nodes 104 and remedying the anomalous operation to resolve the malfunction associated with the anomalous operation.

Detect Anomalous Operation

As described in embodiments of the present disclosure, a processor 134 of the server device 114 may be configured to detect, for example, an anomalous operation (faulty operation) associated with a computing node 104-1 and further identify remedy actions associated with the faulty operation. For example, the server device 114 is connected to one or more computing nodes 104 via a network 116. By way of example, each of one or more computing nodes 104 is an ATM that includes one or more software programs **102*a* and one or more updated software programs 102*b*** to perform operations associated with the ATM.

In some cases, an anomalous operation may occur during the functioning of computing node 104-1 (see FIG. 1), causing it to malfunction or fault. The anomalous operation may occur in the functioning of computing node 104-1, causing operations associated with computing node 104-1 to malfunction or fault. An anomalous operation associated with computing node 104-1 may include a faulty operation associated with components 194 (hardware components) or software programs **102*a* and updated software program 102*b* (software components) running at the computing node 104-1 or a combination thereof. For example, when a computing node 104-1 is an ATM, a hardware faulty operation may include a malfunction associated with components 194, for example, a keypad (keypad error), receipt printer (printer error), card reader, a cash dispenser, a PIN pad, display monitor, sensors or other hardware components of the ATM. Software related faulty operations associated with an ATM may include software maintenance error. Software maintenance error occurs when a faulty operation is caused by one or more software programs 102*a* installed and running at the computing nodes 104-1 is not updated. For example, an older version of a software program 102*a* that has not been updated at the computing node 104-1 may cause faulty operation at the computing node 104-1. Software maintenance errors may result in faulty operations such as user interface (UI) errors, for example, unexpected or corrupted display of information on the display monitor or unresponsive touch buttons on the ATM user interface. In such a case, installing, re-installing and/or updating the software program 102*a* that causes the faulty operation with an updated software program 102*b* (USP 102*b*) may resolve the malfunction. In some cases, the computing node 104-1** may need to be re-imaged, which typically includes wiping all data from the hard drive and installing a fresh operating system and other software tools.

Receive a Fault Event Message, Including a Fault Event Identifier

A computing node 104 (e.g., 104-1) may be configured to generate a fault event message 126 in response to detecting the anomalous operation at the computing node 104-1. Further, the computing node 104-1 may be configured to transmit the fault event message 126 to the server device 114. The anomalous operation may occur in the functioning of computing node 104-1, causing operations associated with computing node 104-1 to malfunction or fault. For example, an interaction performed by user 1 with a keypad component 194 of the computing node 104-1 (e.g., an ATM 104-1) results in generating the fault event message 126 in response to detecting a malfunction of the keypad (i.e., anomalous operation) during the interaction. It may be noted that embodiments of the present disclosure are described with reference to a malfunction associated with the computing node 104-1. However, a person having ordinary skill in the art may appreciate that the embodiments apply to all computing nodes (illustrated or otherwise) connected to the network 116.

The received fault event message 126 (see FIG. 2A) generated by the computing node 104-1 may include a fault event identifier **126*a* and a plurality of computing node parameters 126*b*-126*n***.

The computing node parameters **126*b*-126*n* include a computing node identifier 126*b* associated with the computing node 104-1, a geolocation 126*c* of the computing node 104-1, a timestamp (T1) 126*d* of the last registered maintenance performed on the computing node 104-1, an event type 126*e*, and/or timestamp (T2) 126*n* of the anomalous operation. The computing node identifier 126*b* is a unique identifier assigned to the particular computing node 104-1 that uniquely identifies the computing node 104-1 in the network 116. Further, each computing node (e.g., 104-1 to 104-*n*) is assigned a unique computing node identifier 126*b* (e.g., "CN_12345"). The geolocation 126*c* of the computing node 104-1 specifies the geographical location of the computing node 104-1. In one example, the geolocation 126*c* may include global positioning system (GPS) coordinates, which are usually expressed as a combination of latitude and longitude. The timestamp (T1) 126*d* of the last registered maintenance performed on the computing node 104-1 may indicate a date and time when software updates were performed on the computing node 104-1 as part of software maintenance, date and time a battery pack was replaced, or date and time when component 194 was replaced, although any other type of maintenance related operations may also be included. Event type 126*e* represents a type of component (hardware or software) causing the anomalous operation in the computing node 104-1. For example, when the computing node 104-1 is an ATM, and the anomalous operation occurs at a keypad component 194 of the ATM, then the event type 126*e* is "Keypad error." In another example, event type 126*e* may include a software component type event (e.g., "Software maintenance error") or hardware component type event (e.g., "Keypad error," "Printer error," or "Display error"). The timestamp (T2) 126*n* of the anomalous operation represents the date and time when the anomalous operation was detected at the computing node 104-1**.

In an embodiment, the computing node parameters **126*b*-126*n* may also include an operating system version, a backup battery percentage associated with the backup battery component 194 of the computing node 104-1, a time period from when the ATM was last rebooted, heating indicators of components 194 of the computing node 104-1, a timestamp of when software maintenance was performed on the computing node 104-1, and a timestamp of when hardware maintenance was performed on the computing node 104-1, although any other parameter related to the operations of the computing node 104-1** may also be included.

The fault event identifier **126*a* may be representative of the nature of the anomalous operation (i.e., malfunction or a faulty operation) that occurred at the computing node 104-1. For example, computing node 104-1 may store a historical events dataset 118 that is configured with a list of known fault event identifiers 124 (see FIG. 2C), wherein each known fault event identifier 124*a*-124*d* in the list of known fault event identifiers 124 is associated with at least one of a known faulty operations 120 and a corresponding known remedy actions 122, respectively. For example, the computing node 104-1 is configured to identify a particular known malfunction or a known faulty operation (e.g., printer component 194 not working) that occurred at the computing node 104-1, and then the computing node 104-1 assigns a corresponding known fault event identifier 124*d* "E004" (associated with the printer component 194 not working) from the pre-configured list of known fault event identifiers 124 stored at the computing node 104-1. As shown in FIG. 2B, fault event message 126 includes the fault event identifier 126*a*, wherein the fault event identifier 126*a* is a known fault event identifier 124*d* "E004" identified by the computing node 104-1. However, when the computing node 104-1 identifies an unknown malfunction or an unknown anomalous operation that is not associated with any of the list of known fault event identifiers 124, then this unknown anomalous operation (faulty operation) is assigned a new fault event identifier "E009" and is included in the fault event message 126 (see FIG. 2A) as the fault event identifier 126***a* and sent to server device 114.

The historical events dataset 118 is stored at the computing nodes 104-1 to 104-*n* and the server device 114, and the data within the historical events dataset 118 is common across the computing nodes 104-1 to 104-*n* and the server device 114. When the historical events dataset 118 is updated by a server device 114 (explained in detail below). The processor 134 transmits the updates to each of the copies of the historical events dataset 118 stored at the computing nodes 104-1 to 104-*n*. Thus, when the historical events dataset 118 is updated at the server device 114, the updated data is copied across to the computing nodes 104-1 to 104-*n*, by the server device 114, such that all the copies of the historical events dataset 118 always reflect the same data.

Determine Whether the Fault Identifier is a Known or Unknown Fault Event Identifier Upon receiving the fault event message 126 from the computing node 104-1, the processor 134 may be configured to access the historical events dataset 118 stored in the memory 128 that includes the list of known fault event identifiers 124, for example, known fault event identifiers 124*a*-124*d* and determine if the received fault event identifier 126*a* in the fault event message 126 matches to at least any one of known fault event identifiers 124*a*-124*d.*

Figure 2A:
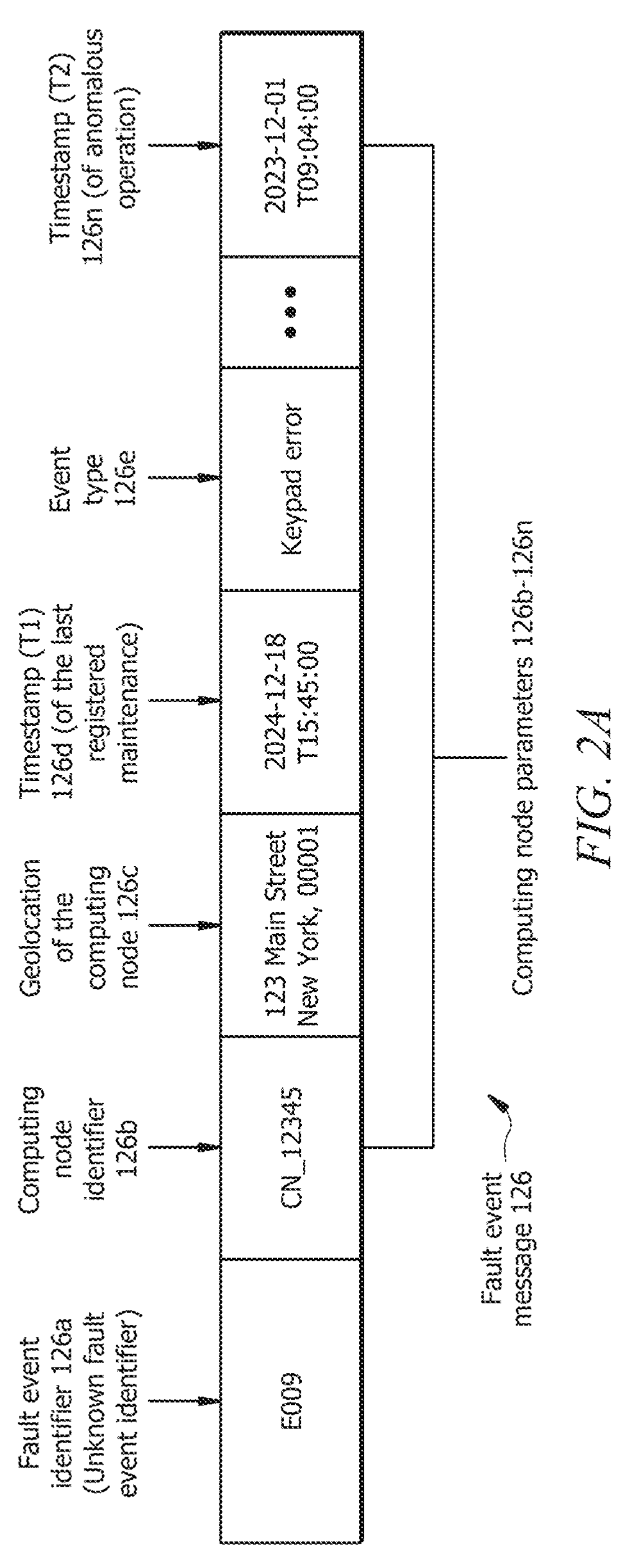
FIG. 2A illustrates a fault event message including an unknown fault event identifier, in accordance with one or more embodiments of the present disclosure.
Figure 2B:
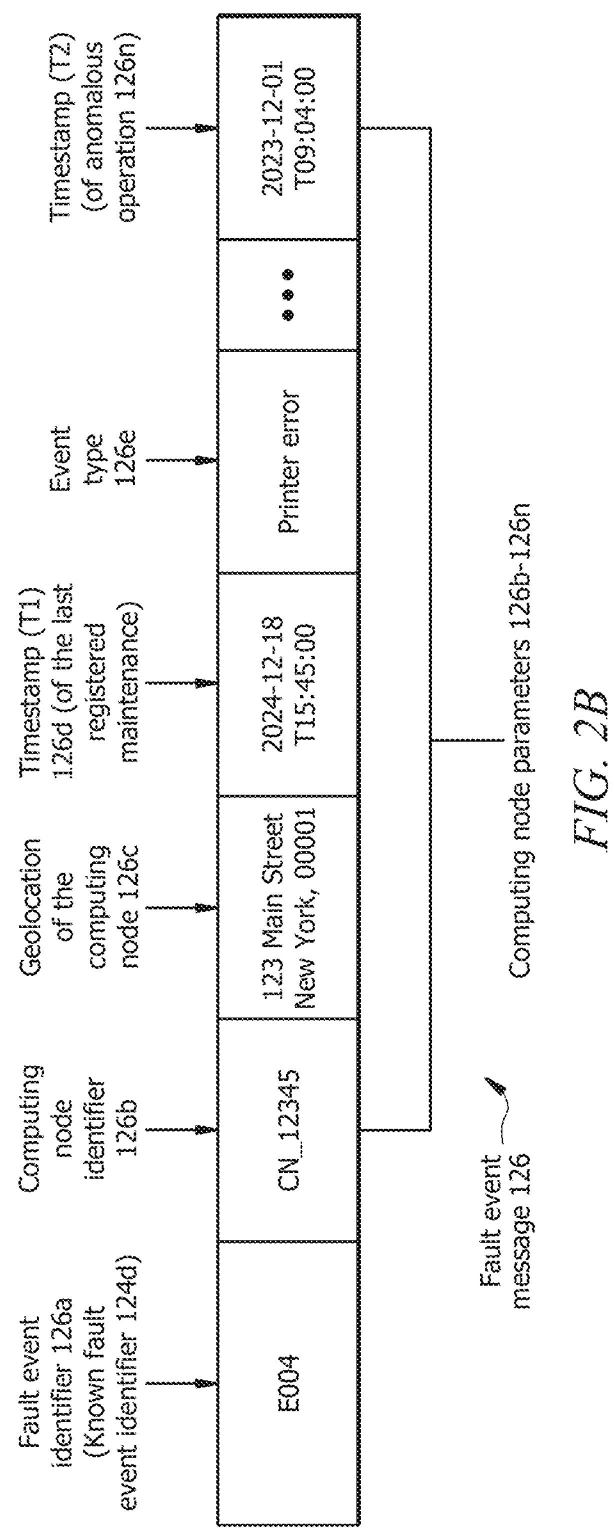
FIG. 2B illustrates a fault event message including a known fault event identifier, in accordance with one or more embodiments of the present disclosure.
Figure 3:
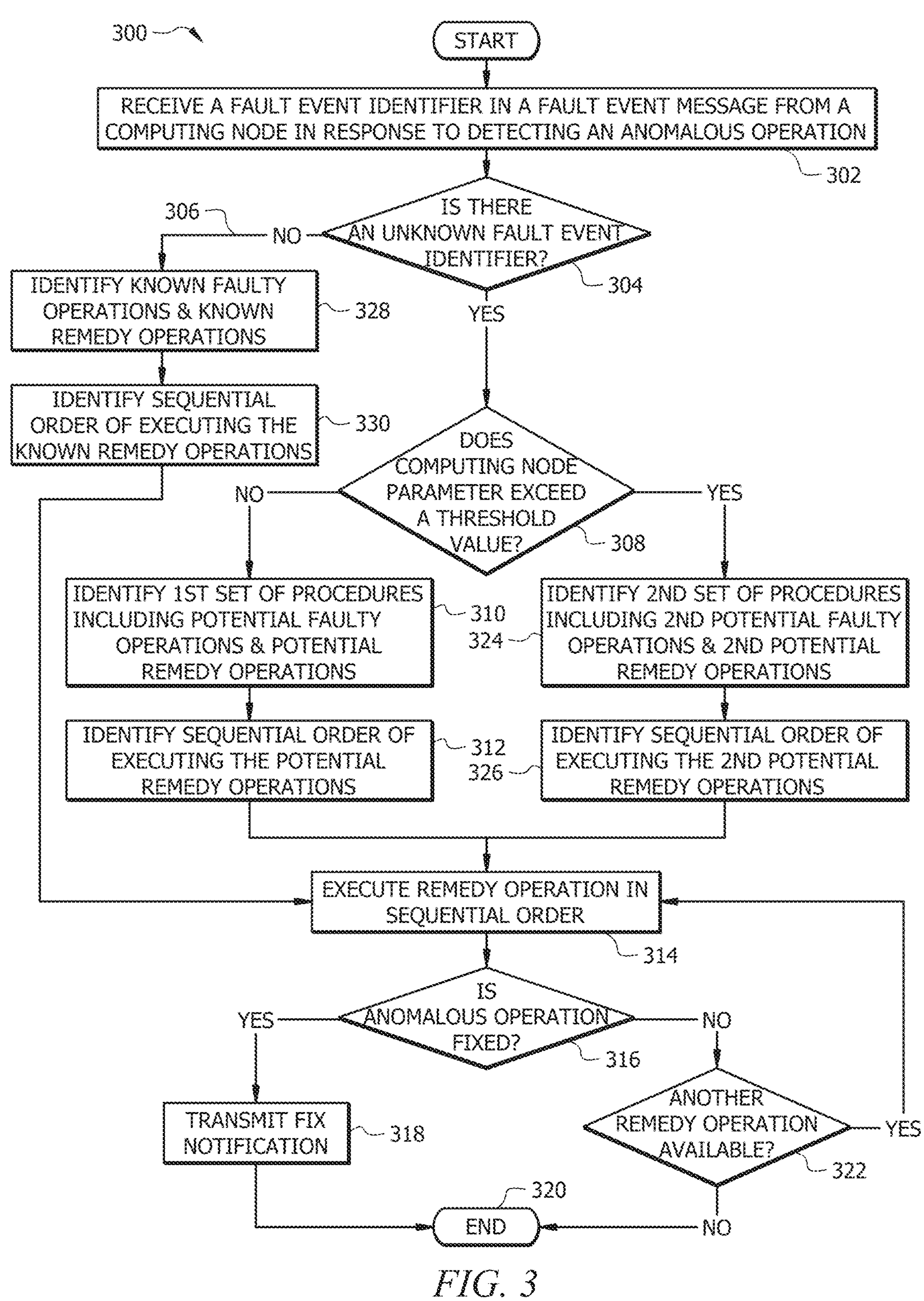
FIG. 3 illustrates an example flowchart of a method of the system of FIG. 1 for detecting an anomalous operation associated with a computing node and remedying the anomalous operation to resolve the malfunction associated with the anomalous operation, in accordance with one or more embodiments of the present disclosure.

For example, with reference FIG. 2A, when the received fault event identifier 126*a* is "E009" (i.e., an unknown fault event identifier), then processor 134 determines that none of the known fault event identifiers 124*a*-124*d* in the list of known fault event identifiers 124 matches with the received fault event identifier 126*a*. Upon determining that none of the known fault event identifiers match the received fault event identifier 126*a*, processor 134 determines that the received fault event identifier 126*a* is an unknown fault event identifier. An unknown fault event identifier indicates that the anomalous operation identified at the computing node 104-1 is a faulty operation that has not been previously identified and, hence, is not part of the historical events dataset 118. Thus, processor 134 cannot identify the faulty operation causing the anomalous operation.

In another example, with reference FIG. 2B, when the received fault event identifier 126*a* is "E004", then processor 134 determines that the received fault event identifier 126*a* matches with fault event identifier 124*d* "E004" from the list of the known fault event identifiers 124. Upon determining the known fault event identifier 124*a* matches with the received fault event identifier 126*d*, processor 134 determines that the received fault event identifier 126*a* is a known fault event identifier 126*d.*

Unknown Fault Event Identifier: Computing Node Parameter does not Exceed a Threshold Value With reference to FIG. 2D, when processor 134 determines that the received fault event identifier 126*a* is an unknown fault event identifier, then processor 134 executes the AI algorithm 144 to identify a first set of procedures 154. The AI algorithm 144 is trained on a rules dataset 146 that includes a plurality of rules 152 to identify a set of procedures 150. The plurality of rules 152 includes rules 152*a*-152*d.*

Training of AI Algorithm

Memory 128 stores AI algorithms 144, 145*a*, 145*b* (e.g., at least one machine learning, neural network, or deep learning algorithm) to identify a set of procedures 150. Processor 134 executes software instructions 140 to implement the AI algorithms 144, 145*a*, 145*b* and is generally configured to perform one or more operations associated with identifying the set of procedures 150. In some embodiments, processor 134 trains the AI algorithms 144, 145*a*, 145*b* to identify the set of procedures 150 based on a rules dataset 146.

The AI algorithms 144, 145*a*, 145*b* may include a support vector machine, machine learning, neural network, random forest, deep learning algorithm, k-means clustering, Tree-based algorithm, Random Forest algorithm, convolutional neural network (CNN), deep neural network (DNN), recurrent neural network (RNN), Naïve Bayes classification, etc. In some embodiments, the AI algorithms 144, 145*a*, 145*b* may include a data processing machine learning algorithm that is configured to perform one or more operations associated with detecting malicious tags and eliminating malicious attacks. The AI algorithms 144, 145*a*, 145*b* may be implemented by supervised, semi-supervised, and/or unsupervised machine learning.

The AI algorithm 144 is trained based on a first dataset and a second dataset. The first dataset includes labeled data values and unlabeled data values corresponding with each of the computing node parameters 126*b*-126*n* data and further includes predefined threshold values corresponding with each of the computing node parameters 126*b*-126*n*. The second dataset (also referred to as rules dataset 146) includes one or more rules 152*a*-152*d* that are selected when the data value associated with the computing node parameters 126*b*-126*n* exceeds the predefined threshold value. As part of the first stage of the training of the AI algorithm 144, the first dataset and the second dataset are input into the AI algorithm 144 to output a third dataset. In the first stage, the AI algorithm 144 is trained to determine if a data value associated with labeled data values and unlabeled data values corresponding with each of the computing node parameters 126*b*-126*n* exceeds a predefined threshold value. Those unlabeled data values that were incorrectly determined to exceed the predefined threshold value are stored in the third dataset. As part of the second stage of the training of the AI algorithm 144, the third dataset, along with the first dataset, is input into the AI algorithm 144 to retrain the AI algorithm 144. The second stage of training may be repeated iteratively until the required threshold level of accuracy to determine which one of the rules 152*a*-152*d* is satisfied based on a data value associated with the computing node parameters 126*b*-126*n* exceeding the predefined threshold value is achieved for the AI algorithm 144.

For example, the AI algorithm 144 is trained to determine which one of the rules 152*a*-152*d* is satisfied based on determining if a data value associated with the computing node parameters 126*b*-126*n* exceeds a predefined threshold value. When the AI algorithm 144 determines, for example, that rule 152*a* from the rules 152*a*-152*d* is satisfied, then the AI algorithm 144 identifies one or more potential faulty operations 156*a*-*c* and corresponding one or more potential remedy actions 158*a*-*c* corresponding with the rule 152*a*.

In another embodiment, processor 134 executes the AI algorithms 144, 145*a*, 145*b* to perform one or more operations associated with detecting an anomalous operation associated with one or more computing nodes 104 and remedying the anomalous operation to resolve the malfunction associated with the anomalous operation.

In another embodiment, processor 134 executes software instructions 140 and is configured to perform one or more operations associated with detecting an anomalous operation associated with one or more computing nodes 104 and remedying the anomalous operation to resolve the malfunction associated with the anomalous operation without utilizing AI algorithms 144, 145*a*, 145*b*.

Applying the Rules to Identify Potential Faulty Operations and Potential Remedy Actions For example, with reference to FIG. 2D, a first rule 152*a* defines identifying a first set of procedures 154 when a data value of timestamp (T1) 126*d* associated with the computing node parameter does not exceed a first predefined threshold value TV1. Computing node parameter is a timestamp (T1) 126*d* of the last registered software maintenance performed on the computing node 104-1, e.g., T1 is "2024-12-18 T15:45:00" (i.e., data value). Accordingly, rule 152*a* defines the predefined threshold value TV1 as a date and time, e.g., "2025-01-01 T10:00:00", that is compared with the data and time T1. Here, T1 is 2024-12-18 T15:45:00, and represents the date of Dec. 18, 2024 and time of 3:45 PM. Further, TV1 is 2025-01-01 T10:00:00 and represents the date of Jan. 1, 2025, and time of 10:00 AM. Based on this comparison, if T1 is performed before TV1, it is determined that T1 does not exceed TV1, then the AI algorithm 144 identifies the first set of procedures 154 to identify and remedy the anomalous operation. The first set of procedures 154 includes three pairs of potential faulty operations and remedy actions, which include a first potential faulty 156*a* and a first potential remedy action 158*a*, a second potential faulty 156*b* and a second potential remedy action 158*b*, and a third potential faulty 156*c* and a third potential remedy action 158*c*.

In another embodiment, the second rule 152*b* defines when a data value of timestamp (T1) 126*d* associated with the computing node parameter does exceed a first predefined threshold value TV1 identifying the second set of procedures 160. For example, when the AI algorithm 144 performs the comparison between T1 and TV1, the AI algorithm 144 may determine that T1 does exceed TV1, then AI algorithm 144 identifies the second set of procedures 160 to be associated with identifying and remedying the anomalous operation. The second set of procedures 160 may include two pairs of potential faulty operations and remedy actions, which include a first potential faulty operation 162*a* and a first potential remedy action 164*a*, and a second potential faulty 162*b* and a second potential remedy action 164*b*.

In another embodiment, with reference to FIG. 2E, the third rule 152*c* defines identifying a subset of procedures 155 from the first set of procedures 154 based on a combination of computing node parameter 126*d* and computing node parameter 126*e*. As explained above, the AI algorithm 144 determines the first set of procedures 154 based on performing the comparison between T1 and TV1. Upon determining the first set of procedures 154, the third rule 152*c* requires the AI algorithm 144 to determine the type of event associated with the anomalous operation based on identifying the event type 126*e* computing node parameter. For example, the AI algorithm 144 determines that the event type 126*e* is a "Keypad error," then the AI algorithm 144 utilizes this event type 126*e* to identify a subset of procedures 155 from the first set of procedures 154 that are associated with a keypad related faulty operations. Thus, in this example, the subset of procedures 155 may include a first potential faulty 156*a* and a first potential remedy action 158*a*, and a third potential faulty 156*c* and a third potential remedy action 158*c* that includes procedures that are directed towards keypad faulty operations. This subset of procedures 155 may not include a second potential faulty 156*b* and a second potential remedy action 158*b* because the second potential faulty 156*b* is not directed toward keypad-related faulty operations. Similar to the third rule 156*c*, the fourth rule 152*d* defines identifying a subset of procedures 161 based on a combination of computing node parameter 126*d* and computing node parameter 126*e*.

In another example, the fifth rule of the plurality of rules 152 may define that when the event type 126*e* is "Printer error" then identifying the third set of procedures based on a combination of "E001+E004", i.e., a combination of known faulty operations 120 and known remedy actions 122 corresponding to the known fault event identifier 124*a* "E001" and known fault event identifier 124*d* "E004". For example, the AI algorithm 144, when it identifies the fifth rule, then accesses the historical events dataset 118 and determines the known faulty operations 120*a* and known remedy actions 122*a*, respectively, associated with the known fault event identifier 124*a*. Further, AI algorithm 144 accesses the historical events dataset 118 and determines the known faulty operations 120*d*, 120*e*, 120*f* and known remedy actions 122*d*, 122*e*, 122*f*, respectively, associated with the known fault event identifier 124*d* "E004". The AI algorithm 144 then generates the third set of procedures by combining known faulty operations 120*a*, 120*d-f* and known remedy actions 120*a*, 120*d-f*, respectively.

In another example, the sixth rule of the plurality of rules 152 defines that when the event type 126*e* is "Software maintenance error" then the identified set of procedures is determined based on identifying the last two historical faulty operations and remedy actions applied to the computing node 104-1. The AI algorithm 144 accesses the historical computing node event dataset 186 (see FIG. 2F) to determine the last two faulty operations and their corresponding remedy actions as 186*a* and 186*b* based on the computing node identifier 126*b* "CN_12345" of the computing node 104-1 corresponding to the event type 126*e* "Software maintenance error". The historical computing node event dataset 186 is a list of recent faulty operations and their corresponding remedy actions applied to the computing nodes 104-1 to 104-*n* and stored in the historical events dataset 118.

Identify a Sequential Order of Execution of Potential Remedy Actions

Upon identifying the first set of procedures 154 in response to determining that data value timestamp (T1) 126*d* associated with the computing node parameter does not exceed the first predefined threshold value TV1, then the processor 134 determines a sequential order 188 of executing the identified first set of procedures 154 based on a plurality of execution criteria 182 stored in the historical events dataset 118.

The plurality of execution criteria 182 may include, for example, a past number of successful fixes 184 associated with each of the remedy actions included in the first set of procedures 154, a type of event type 126*e* (hardware component event type (e.g., "Printer error") or software component event type (e.g., "Software maintenance error")), or a combination thereof. Other criteria associated with the execution of the first set of procedures 154 may also be included as part of the plurality of execution criteria 182.

With reference to FIG. 2D, the rules dataset 146 stores data associated with the past number of successful fixes 184 associated with each of the potential faulty operations (e.g., first potential faulty operation 156*a*) and potential remedy actions (e.g., first potential remedy action 158*a*) included in the set of procedures 150. The past number of successful fixes 184 is updated based on determining when a potential remedy action (e.g., first potential remedy action 158*a*) is executed. If it fixes the anomalous operation, then the past number of successful fixes 184 associated with that first remedy action 158*a* is updated by incrementing it (explained further in detail below).

Upon identifying the first set of procedures 154, the processor 134 accesses the historical events dataset 118 and determines the past number of successful fixes 184 associated with each of the potential remedy actions 158*a*, 158*b*, and 158*c* included in the first set of procedures 154. Based on the determined past number of successful fixes 184 associated with each of the potential remedy actions 158*a*, 158*b*, and 158*c*, the processor 134 determines a sequential order 188 of executing the identified potential remedy actions 158*a*, 158*b*, and 158. For example, the sequential order of execution may be a descending order or an ascending order of the past number of successful fixes 184 associated with each of the potential remedy actions 158*a*, 158*b*, and 158*c*.

FIG. 2D shows a sequential order 188 based on descending order of the past number of successful fixes 184, such that the first potential remedy action 158*a* would be executed first, followed by the second potential remedy action 158*b*, and the third potential remedy action 158*c* would be executed last.

In another example, the sequential order 188 may be reversed where the third potential remedy action 158*c* is executed first, followed by the second potential remedy action 158*b* and the first potential remedy action 158*a* would be executed last.

Execute Remedy Actions in the Sequential Order

The processor 134 upon identifying the sequential order 188 of executing the potential remedy actions 158*a*, 158*b*, and 158*c*, initiates executing the remedy actions 158*a*, 158*b*, and 158*c* in the identified sequential order 188. For example, a sequential order 188 based on a descending order of the past number of successful fixes 184 is executed such that first potential remedy action 158*a* is executed first.

The first potential remedy action 158*a* is associated with the first potential faulty operation 156*a*. The first potential faulty operation, for example, is "Keypad registering incorrect input because software version is not updated and may have bugs". Here, T1 is 2024-12-18 T15:45:00, and represents the date of Dec. 18, 2024 and time of 3:45 PM. Further, TV1 is 2025-01-01 T10:00:00 and represents the date of Jan. 1, 2025, and time of 10:00 AM. Since timestamp (T1) of the last registered software maintenance performed on the computing node 104-1, e.g., T1 is "2024-12-18 T15:45:00" does not exceed the predefined threshold value TV1, e.g., "2025-01-01 T12:00:00", the system determines that the computing node 104-1 includes a software program (SP) 102*a* that is not updated. Further, the system determines that SP 102*a* needs to be updated to an updated version referred to as updated software program (USP) 102*b* released after the TV1 time to fix the anomalous operation. USP 102*b* includes updates to fix bugs included in the SP 102*a* (also referred to as outdated software program 102*a*). Here the system determines that the anomalous operation potentially could be because the SP 102*a* has not been updated and hence refers to this as the first potential faulty operation 156*a*.

Execute First Potential Remedy Action 158*a* in the Sequential Order

The first potential remedy action 158*a* identified is "Identifying lowest latency neighboring computing node to request software program update". Accordingly, the remedy action is to identify the geographically closest computing node (e.g., computing node 104-2) to the computing node 104-1, which includes the updated software program (USP) 102*b*.

In this context, processor 134 may have access to a node list 190 that includes a list of computing node identifiers (e.g., computing node identifier 126*b* of the computing nodes 104-1) corresponding to each of the computing nodes 104-1 to 104-*n*. Each of the computing node identifiers in the node list is mapped at least to a geolocation information associated with each of the computing nodes 104-1 to 104-*n* and to an identifier associated with one or more software programs 102*a* (and the updated software program (USP) 102*b*) installed at the respective computing nodes 104-1 to 104-*n*.

For example, for the computing node 104-1, the node list 190 includes the geographical location of the computing node 104-1 and an identifier associated with the software program 102*a* installed at the computing node 104-1. From the computing nodes 104-2 to 104-*n*, the system determines which one of these would be the closest to the computing node 104-1, where the anomalous operation takes place by searching the node list 190 to determine which of the computing nodes 104-2 to 104-*n* includes the USP 102*b*. Once identifying the computing nodes 104-2 and 104-*n* to include the USP 102*b*, processor 134 determines which one of the computing nodes 104-2 and 104-*n* is closer to the computing node 104-1 based on determining their geolocation information stored in the node list 190. For example, here, computing node 104-2 is geographically closer to computing node 104-1; hence, computing node 104-2 is selected as the closest neighbor to computing node 104-1. Essentially, the system identifies a computing node 104-2 with the USP 102*b* that has the lowest latency communication path to the computing node 104-1, including the SP 102*a*, and requires the USP 102*b* to remedy its anomalous operation. The assumption here is that a computing node 104-2 that is geographically nearest to the malfunctioning computing node 104-1 most likely has the lowest latency communication path to the malfunctioning computing node 104-1.

Next, upon identifying the computing node 104-2 as the closest neighbor to computing node 104-1, the processor 134 transmits a transfer command to the computing node 104-2 for transferring one or more software program files (e.g., USP 102*b*) from the computing node 104-2 to the computing node 104-1. The transfer command further includes an instruction to transmit the USP 102*b* to the computing node 104-1 over a peer-to-peer connection with the computing node 104-1 over the computing node network. The idea here is that a peer-to-peer connection provides the lowest latency communication path between the computing nodes 104-1 and 104-2. Thus, transmitting the USP 102*b* to the computing node 104-1 over a peer-to-peer connection most likely is the fastest method to get the USP 102*b* to the computing node 104-1. This generally results in a faster install of the USP 102*b* at the computing node 104-1, causing a faster remedy of the computing node 104-1 from the anomalous operation, thus reducing any downtime associated with the malfunctioning computing node 104-1.

Upon installing the USP 102*b* at the computing node 104-1 from computing 104-2, processor 134 determines whether the first potential remedy action 158*a* fixes the anomalous operation at the computing node 104-1 by transmitting a request to perform the operation associated with the anomalous operation to the computing node 104-1 to determine if the fault event identifier 126*a* has been resolved/cleared at the computing node 104-1. Upon determining that the first potential remedy action 158*a* successfully fixed the anomalous operation, processor 134 then transmits a notification on a user interface associated with the computing node 104-1 to indicate to the user 1 that the anomalous operation (e.g., a malfunction of the keypad) has been fixed. Additionally, the processor 134 also inputs the received fault event identifier 126*a* (i.e., the unknown fault event identifier "E009") into the list of known fault event identifiers 124 in the historical events dataset 118 along with the first potential faulty operation 156*a* (e.g., stored as a known faulty operation 7) and the first potential remedy action 158*a* (e.g., stored as known remedy action 7). Further, processor 134 updates the past number of successful fixes 184 data associated with the first potential faulty operation 156*a* and the first potential remedy action 156*b* in the rules dataset 146.

However, upon determining that the first potential remedy action 158*a* does not fix the anomalous operation at the computing node 104-1, then processor 134 executes the second potential remedy action 158*b*.

As such, the disclosed systems may improve the current technologies by detecting anomalous operations of an outdated software program 102*a* and remedying the anomalous operation by installing an updated software program 102*b*. As described in embodiments of the disclosure, the described system and method identify a computing node 104-2 that has the lowest latency communication path to the computing node 104-1, where the anomalous operation takes place and commands the computing node 104-2 to transmit program files related to the updated software program 102*b* over a peer-to-peer connection with the computing node 104-1. This reduces the latency associated with resolving the malfunction and, in turn, reduces any downtime relating to the computing node 104-1 caused by the anomalous operation or malfunction. Further, reducing downtime relating to the computing node 104-1 caused by the anomalous operation improves the computing node 104-1 performance. In addition, having the nearest computing node transmit program files of USP 102*b* to the computing node 104-1 saves network resources (e.g., network bandwidth) that would otherwise be used to transmit program files of USP 102*b* to the computing node 104-1 from a faraway computing node.

Execute the Second Potential Remedy Action 158*b* in the Sequential Order

The second potential remedy action 158*b* identified is "Check for unexpected fluctuation of electrical signals caused by one or more components". Accordingly, the remedy action is to remotely check for unexpected fluctuation of electrical signals generated within components of the computing node 104-1.

Computing node 104-1 includes several hardware components to perform its operation. For example, the computing node 104-1 is an ATM. For example, an ATM includes several components such as include circuit boards, wire cables, memory components, microchips, cash dispenser, cassettes (for storing bill notes), user interfaces (e.g., display screen, keypads, etc.), among any other component that any ATM includes. Further, each computing node 104-1 to 104-*n* includes a sensor 117, respectively. Sensors 117 are electromagnetic (EM) sensors that are configured to detect EM radiation signals propagated from the electrical components.

The sensors 117 may be configured to detect a broad range of frequencies, e.g., from 100 KHz to 5 MHz, or any frequency that a component 194 may propagate. When the first electrical component 194 of the computing node 104-1 transmits an electrical signal as part of its operation, the sensor (S1) 117 is used to capture such EM wave radiation signal generated by the electrical signal. The sensor 117 (S1) is further configured to capture other wireless signals, e.g., signals in WIFI bandwidth, Bluetooth bandwidth, etc. For example, assume that there are ten components 194 in ATM 104-1. Thus, sensor 117 (S1) captures the EM radiations from each of the ten components 194 and determines each frequency associated with each of the ten components 194.

For example, the sensor 117 (S1) determines that a first frequency (e.g., 120 KHz) is associated with a first component 194, a second frequency (e.g., 130 KHz) is associated with a second component 194, and so on. The processor 134 receives this frequency information associated with each of the components 194 from the sensor 117 (S1) and utilizes it to determine whether a new component 194 is added to the ATM 104-1 to detect an unverified or malicious component 194 whose EM radiation frequency differs from the stored frequencies associated with each of the ten components 194. For example, if processor 134 determines that the faulty operation is a tampering event at ATM 104-1, then processor 134 transmits a request to sensor 117 (S1) to transmit the frequency information associated with all the components at ATM 104-1. In response to receiving all the frequency information, processor 134 may detect an eleventh frequency different from the known ten frequencies associated with the ten components 194 of the computing node 104-1. Thus, processor 134 determines that a new unknown component, 194, has been added to ATM 104-1 and, in response, shuts down the computing node 104-1 as part of remedying the anomalous operation. In another embodiment, processor 134 generates a service ticket request and transmits it to the associated administrative user device 106. The administrative user device 106 would then request a service provider vehicle to physically visit the computing node-104-1 to remedy the anomalous operation.

Additionally, the processor 134 also inputs the received fault event identifier 126*a* (i.e., the unknown fault event identifier "E009") into the list of known fault event identifiers 124 in the historical events dataset 118 along with the second potential faulty operation 156*b* (e.g., may be stored as a new known faulty operation) and the second potential remedy action 158*b* (e.g., may be stored as a new known remedy action). Further, processor 134 also updates the past number of successful fixes 184 data associated with the second potential remedy action in the rules dataset 146.158

However, upon determining that the first potential remedy action 158*a* does not fix the anomalous operation at the computing node 104-1, then processor 134 executes the third potential remedy action 158*c*.

As such, the disclosed systems may improve the current technologies by detecting anomalous operations and remedying security threats in computing nodes (ATMs) 104-1 to 104-*n* and other computing devices. For example, by analyzing wired and wireless communications of electrical components 194 of the ATMs 104-1 to 104-*n* and other computing devices, the disclosed system learns the unique electrical and EM radiation signal frequency patterns of each component 194 of an ATM 104-1. Thus, the disclosed system detects any unexpected fluctuation in the electrical and/or EM radiation signal of component 194 and determines a particular anomaly caused by the fluctuation (e.g., caused by a tampering event such as the addition of a malicious component, a new and/or unverified component). Further, shuts down the computing node as part of remedying the ATM 104-1 from the tampering event.

Accordingly, the disclosed system may be integrated into a practical application of securing data stored in ATMs 104-1 to 104-*n* and other computing devices from unauthorized access and, thus, from data exfiltration, modification, destruction, and the like. This, in turn, provides an additional practical application of securing computer systems and servers that are tasked to oversee operations of the ATMs 104-1 to **104-*n* and other computing devices from unauthorized access as well. The disclosed system may be integrated into an additional practical application of improving underlying operations of the ATMs 104-1 to 104-*n*** and other computing devices. For example, the disclosed system may decrease processing, memory, and time resources spent in securing data stored in the ATMs and other computing devices that would otherwise be spent using the existing information security technologies.

Execute the Third Potential Remedy Action **158*c*** in the Sequential Order

The third potential remedy action **158*c* identified is "Transmit service ticket and display out-of-service notification." Since the potential remedy actions 158*a* and 158*b* in the sequential order 188 have failed, the last potential remedy action is to generate a service ticket request and transmits the service ticket request to the associated administrative user device 106. The administrative user device 106 would then request a service provider vehicle to physically visit the computing node-104-1** to remedy the anomalous operation.

For Unknown Fault Event Identifier

When Computing Node Parameter Exceeds a Threshold Value

Upon identifying the second set of procedures 160 in response to determining that data value of the timestamp (T1) **126*d* associated with the computing node parameter does exceed the first predefined threshold value TV1, then the processor 134 determines a sequential order 188 of executing the identified second set of procedures 160 based on a plurality of execution criteria 182 stored in the historical events dataset 118**.

Upon identifying the second set of procedures 160, processor 134 accesses the past number of successful fixes 184 associated with each of the potential remedy actions **164*a* and 164*b* included in the second set of procedures 154. Based on the determined past number of successful fixes 184 associated with each of the potential remedy actions 164*a* and 164*b*, the server device 114 determines a sequential order 188 of executing the identified potential remedy actions 164*a* and 164*b*. For example, the sequential order 188 of execution may be a descending order or an ascending order of the past number of successful fixes 184 associated with each of the potential remedy actions 164*a*, and 164*b***.

FIG. 2D shows a sequential order 188 based on descending order of the past number of successful fixes 184, such that the first potential remedy action **164*a* would be executed first and the second potential remedy action 164*b*** would be executed last.

The first potential remedy action **164*a* identified is "Reset network settings". Accordingly, the remedy action is to reset network settings associated with the computing node 104-1. The processor 134 transmits a network reset command to reset the network settings of the computing node 104-1**.

Upon executing the first potential remedy action **164*a*, processor 134 determines if the first potential remedy action 164*a* fixes the anomalous operation by transmitting a request to the computing node 104-1 to determine if the fault event identifier 126*a* has been resolved/cleared at the computing node 104-1 (as explained above). In response to successfully fixing the anomalous operation, the processor 134 then transmits a notification on a user interface associated with the computing node 104-1 to indicate to the user 1 that the anomalous operation (e.g., a malfunction of the keypad) has been fixed. Additionally, the processor 134 also inputs the received fault event identifier 126*a* (i.e., the unknown fault event identifier "E009") into the list of known fault event identifiers 124 in the historical events dataset 118 along with the first potential faulty operation 162*a* (e.g., as new known faulty operation) and the first potential remedy action 164*a* (e.g., as new known remedy action). Further, it also updates the number of successful fixes 184 data associated with the first potential faulty operation 162*a* and the first potential remedy action in the rules dataset 146**.

However, upon determining that first potential remedy action **164*a* does not fix the anomalous operation at the computing node 104-1, then processor 134 executes the second potential remedy action 164*b***.

The second potential remedy action **164*b* identified is "Transmit service ticket and display out-of-service notification." Since the potential remedy action 164*b* has failed, the last potential remedy action is to generate a service ticket request and transmit the service ticket request to an administrative user associated with the administrative user device 106. The administrative user device 106 would then request a service provider vehicle to physically visit the computing node-104-1** to remedy the anomalous operation.

For Known Fault Event Identifiers Execute Known Remedy Actions

With reference to FIG. 2B and FIG. 2C, when processor 134 determines that the received fault event identifier **126*a* "E004" is a known fault event identifier, then processor 134 accesses the historical events dataset 118 to identify a known set of procedures 195 that correspond to the fault event identifier 126*a* "E004". The known set of procedures 195 includes known faulty operation 4 (120*d*), known faulty operation 5 (120*e*), known faulty operation 6 (120*f*), and its corresponding known remedy action 4 (122*d*), known remedy action 5 (122*e*), known remedy action 6 (120*f***), respectively.

Processor 134 then identifies an order of executing the known remedy actions **122*d*, 122*e*, and 122*f*. As explained above, identifying the order of execution of the known set of procedures 195 is similar to identifying the order of execution of the first set of procedures 154. Accordingly, based on the determined past number of successful fixes 184 are associated with each of the known remedy actions 122*d*, 122*e*, and 122*f*. The known remedy action 122*d* is executed first, the known remedy action 122*e* is executed second, and the known remedy action 122*f*** is executed last.

Processor 134 then executes the known remedy actions **122*d*, 122*e*, and 122*f* in the determined order of execution, similar to the execution of the potential remedy actions 158*a*, 158*b*, and 158*c*, as explained above. The known remedy action 4 (122*d*) is executed first by transmitting a command to the computing node 104-1 to reset its network settings, and if the known remedy action 4 (122*d*) does not fix the anomalous operation of the computing node 104-1, then processor 134 executes the next known remedy action 5 (122*e*). The known remedy action 5 (122*e*) is executed first by transmitting a command to the computing node 104-1 to restart the computing node 104-1, and if the known remedy action 5 (122*e*) does not fix the anomalous operation of the computing node 104-1, then processor 134 executes the next known remedy action 6 (122*f*). Since the known remedy actions 122*d* and 122*e* have failed, the last known remedy action 6 (122*f*) is to generate a service ticket request and transmit it to the associated administrative user device 106. The administrative user device 106 would then request at least one of the plurality of service provider vehicles 198-1 to 198-3 to visit the computing node-104-1** to remedy the anomalous operation.

With reference to FIG. 2C, the historical events dataset 118 stores data associated with the past number of successful fixes 183. The past number of successful fixes 183 is updated based on determining when any of the known remedy actions 122*d*, 122*e* and/or 122*f* when executed if it fixes the anomalous operation. For example, if known remedy actions 122*d* fixes the anomalous operation, then the past number of successful fixes 183 corresponding with that known remedy actions 122*d* is incremented in the historical events dataset 118.

Example Methods for Detecting and Remedying Faulty Failover of Edge Network Computing Devices Based on Monitored Sensor Data FIG. 3 illustrates an example flowchart of method 300 for detecting and remedying faulty failover of edge network computing devices based on monitored sensor data in accordance with an embodiment of the present disclosure. For example, one or more operations of method 300 may be implemented, at least in part, in the form of software instructions 140 of FIG. 1, stored on a tangible non-transitory machine-readable medium or a computer-readable medium (e.g., memory 128 of FIG. 1) that, when run by one or more processors (e.g., processor 134 of FIG. 1) may cause the one or more processors to perform operations of the method 300.

Example Method 300

Referring to FIG. 3, at operation 302, processor 134 of the server device 114 receives a fault event identifier 126*a* in a fault event message 126 from a computing node 104-1 in response to detecting an anomalous operation at the computing node 104-1. The received fault event message 126 (see FIG. 2A) generated by the computing node 104-1 may include a fault event identifier 126*a* and a plurality of computing node parameters 126*b*-126*n*.

At operation 304, processor 134 of the server device 114 determines if the received fault event identifier 126*a* is an unknown fault event identifier or a known fault event identifier based on accessing the historical events dataset 118 stored in the memory 128 that includes the list of known fault event identifiers 124. For example, with reference FIG. 2A, when the received fault event identifier 126*a* is "E009" (i.e., an unknown fault event identifier), then processor 134 determines that none of the known fault event identifiers 124*a*-124*d* in the list of known fault event identifiers 124 matches with the received fault event identifier 126*a* and thus the received fault event identifier 126*a* is an unknown fault event identifier and the method flows to operation 308. Further, at operation 304, when processor 134 determines that the received fault event identifier 126*a* is a known fault event identifier 124*d* the method takes the NO branch 306 of FIG. 3 (explained in detail below)

At operation 308, processor 134 of the server device 114 executes the AI algorithm 144, which is trained to determine if a data value associated with the computing node parameters 126*b*-126*n* exceeds a predefined threshold value. When it is determined the data value associated with the computing node parameters 126*b*-126*n* does not exceed the predefined threshold value, then AI algorithm 144 determines, for example, that rule 152*a* from the rules 152*a*-152*d* is satisfied, the method flows to operation 310.

At operation 310, for example, when the AI algorithm 144 determines that rule 152*a* from the rules 152*a*-152*d* is satisfied, then the AI algorithm 144 identifies a first set of procedures 154 to potentially remedy the anomalous operation. The first set of procedures 154 includes one or more potential faulty operations 156*a-c* and one or more potential remedy actions 158*a-c*.

At operation 312, processor 134 of the server device 114 determines a sequential order 188 of executing the identified first set of procedures 154 based on a plurality of execution criteria 182 stored in the historical events dataset 118.

At operation 314, processor 134 of the server device 114 executes one or more potential remedy actions 158*a-c* in the identified sequential order 188. For example, the first potential remedy action 158*a* would be executed first, followed by the second potential remedy action 158*b*, and the third potential remedy action 158*c* would be executed last.

At operation 316, processor 134 of the server device 114 executes the first potential remedy action 158*a* and determines if the execution first potential remedy action 158*a* fixes the anomalous operation. When the processor 134 determines that the anomalous operation is fixed then the method flows to operation 318. At operation 318, processor 134 transmits a notification on a user interface associated with the computing node 104-1 to indicate to user 1 that the anomalous operation (e.g., a malfunction of the keypad) has been fixed and the method ends at operation 320.

However, back at operation 316, when processor 134 determines that the anomalous operation is not fixed, the method flows to operation 322.

At operation 322, processor 134 of the server device 114 determines if there are other potential remedy actions as part of the sequential order 188 to be executed. For example, when the next potential remedy action is the second potential remedy action 158*b* in the sequential order 188, the method proceeds back to operation 314 to execute the second potential remedy action 158*b* in the sequential order 188.

However, back at operation 322, when processor 134 determines that there are no other potential remedy actions in sequential order 188 to be executed, then the method flows to operation 320 and ends.

Back at operation 308, when it is determined the data value associated with the computing node parameters 126*b*-126*n* does exceed the predefined threshold value, then AI algorithm 144 determines, for example, that rule 152*b* from the rules 152*a*-152*d* is satisfied, the method flows to operation 324.

At operation 324, when the AI algorithm 144 determines that rule 152*b* from rules 152*a*-152*d* is satisfied, then the AI algorithm 144 identifies the second set of procedures 160 to be associated with identifying and remedying the anomalous operation. The second set of procedures 160 may include two pairs of potential faulty operations and remedy actions, which include a first potential faulty operation 162*a* and a first potential remedy action 164*a*, and a second potential faulty 162*b* and a second potential remedy action 164*b*.

At operation 326, determines a sequential order 188 of executing the identified potential remedy actions 164*a-b* based on a plurality of execution criteria 182 stored in the historical events dataset 118. The sequential order 188 of executing the potential remedy actions 164*a-b* is, for example, executing the first potential remedy action 164*a* first and executing the second potential remedy action 164*b* last.

The method then proceeds to operation 314 to execute the potential remedy actions 164*a-b* in the determined sequential order 188. The execution of the potential remedy actions 164*a-b* at operations 314 to 322 is performed similarly to the execution of one or more potential remedy actions 158*a-c* at operations 314 to 322, as explained above.

Additionally, back at operation 304, when processor 134 determines that the received fault event identifier 126*a* is a known fault event identifier 124*d* the method flows to operation 328 of FIG. 3. For example, with reference FIG. 2B, when the received fault event identifier 126*a* is "E004", then processor 134 determines that the received fault event identifier 126*a* matches with fault event identifier 124*d* "E004" from the list of the known fault event identifiers 124 and thus determines that the received fault event identifier 126*a* is a known fault event identifier 124*d* and the method flows to operation 328.

At operation 328, processor 134 of the server device 114 accesses the historical events dataset 118 to identify a known set of procedures 195 that correspond to the fault event identifier 126*a* "E004". The known set of procedures 195 includes known faulty operation 4 (120*d*), known faulty operation 5 (120*e*), known faulty operation 6 (120*f*), and its corresponding known remedy action 4 (122*d*), known remedy action 5 (122*e*), known remedy action 6 (120*f*), respectively.

At operation 330, processor 134 of the server device 114 identifies an order of executing the known remedy actions 122*d*, 122*e*, and 122*f*. As explained above, identifying the order of execution of the known set of procedures 195 is similar to identifying the order of execution of the first set of procedures 154. Accordingly, based on the determined past number of successful fixes, 184 are associated with each of the known remedy actions 122*d*, 122*e*, and 122*f*. The known remedy action 122*d* is executed first, the known remedy action 122*e* is executed second, and the known remedy action 122*f* is executed last.

The method then proceeds to operation 314 of FIG. 3, to execute the known remedy actions 122*d*, 122*e*, and 122*f* in the determined sequential order 188. The execution of the known remedy actions 122*d*, 122*e*, and 122*f* at operations 314 to 322 is performed similarly to the execution of one or more potential remedy actions 158*a-c* at operations 314 to 322, as explained above.

Location-Based Monitoring of Computing Node Parameters Based on Sensor Data

As described above, previous technologies fail to detect resources (e.g., cash stored) associated with computing nodes 104-1 to 104-*n* that are not functioning at the required operational level. Embodiments of the present disclosure and its advantages may be understood by referring to FIGS. 4-7. FIGS. 4-7 are used to describe systems and methods for location-based monitoring of resources associated with one or more computing nodes 104-1 to 104-*n*, according to some embodiments.

Figure 4:
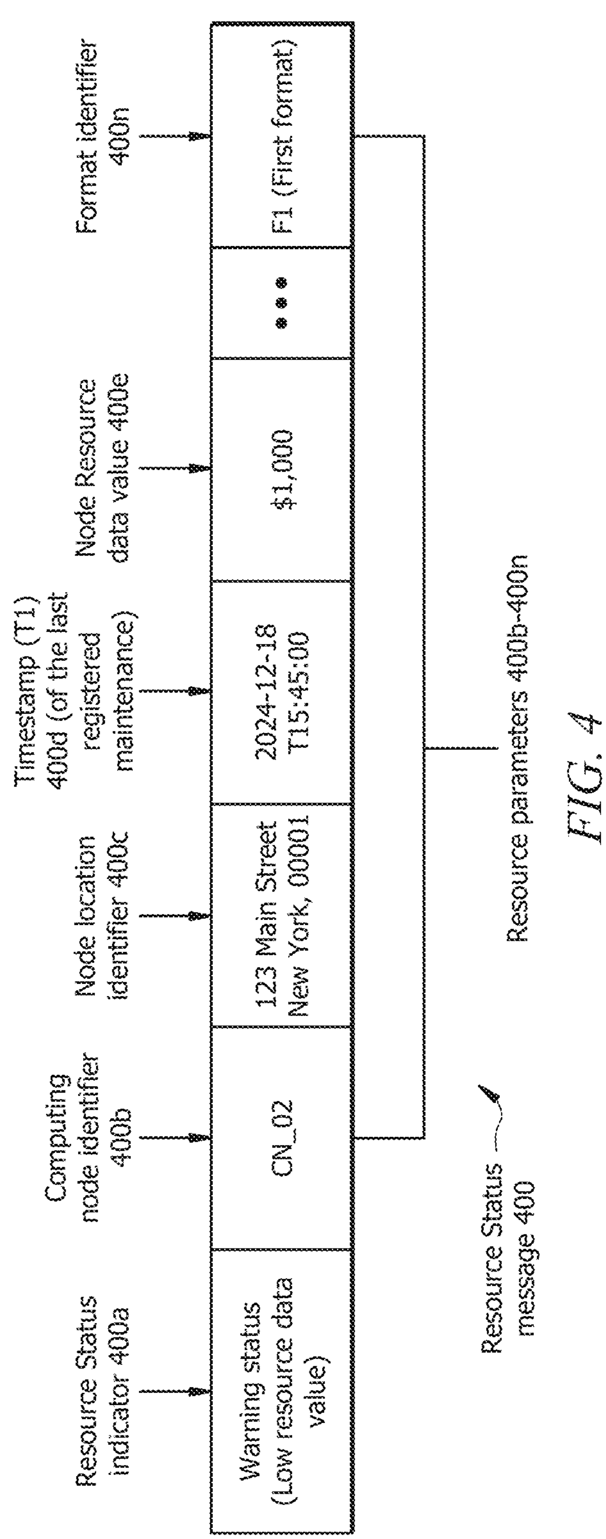
FIG. 4 illustrates a resource status message in accordance with one or more embodiments of the present disclosure.

Receive a Resource Status Message and Determine if it Includes a Warning Status (FIG. 4)

A computing node 104-2 (e.g., an ATM 104-2) may be configured with sensors 117 (S2) to generate a resource status message 400 in response to detecting that a resource at ATM 104-2 is not functioning at the required operational level and electronically transmit the resource status message 400 to the server device 114. The resource status message 400 includes a resource status indicator 400*a*, which is representative of the status of the resource (i.e., a data value of the resource is below a threshold value, for example, cash stored at the ATM 104-2 is below a threshold amount of $1000) at the ATM 104-2.

For example, the resources of ATM 104-2 may include one or more components 194. Further, the resources of the ATM 104-2 may include an external backup power battery, an internal backup power battery, a software program 102*a* (e.g., an outdated software version of the software program 102*a*), or an updated software program 102*b* (e.g., an updated version of the software program 102*a*), currency notes stored at the ATM (ATM cash), printer paper, etc.

The server device 114 electronically receives the resource status message 400 from ATM 104-2 may include a resource status indicator 400*a* and one or more resource parameters 400*b*-400*n*. The resources parameters 400*b*-400*n* (also referred to as computing node parameters interchangeably) may include a computing node identifier 400*b*, a node location identifier 400*c*, a timestamp (T1) of the last registered maintenance performed on the ATM 104-2, a node resource data value 400*e*, a format identifier 400*n*. The term computing nodes (e.g., 104-1, 104-2, and 104-*n*) are used interchangeably with ATMs (e.g., ATM 104-1, ATM 104-2, and 104*n*).

The resource status indicator 400*a* indicates a status information associated with a resource of the ATM 104-2. Accordingly, the resource status indicator 400*a* may indicate a data value associated with currency notes (amount of funds available or cash available) stored at the ATM 104-2. Thus, the resource status indicator 400*a* may indicate that the amount of funds available at the ATM 104-2 is below a threshold value of funds required at the ATM 104-2. When the amount of funds available at the ATM 104-2 is below a threshold value then the ATM 104-2 is determined to be low on funds or low on cash and the resource status indicator includes a "warning status" 400*a*. When the amount of funds available at ATM 104-2 is not below a threshold value, then ATM 104-2 is determined to hold sufficient funds, and the resource status indicator includes a "normal status." The computing node identifier 400*b* is a unique identifier assigned to the particular computing node 104-1 that uniquely identifies the computing node 104-2 in the network 116. Further, each computing node (e.g., ATM 104-1 to ATM 104-*n*) is assigned its own unique computing node identifier. For example, ATM 104-2 has a computing node identifier CN_02. The node location identifier 400*c* indicates the geographical location of the ATM 104-2 based on a GPS system associated with the ATM 104-2. The timestamp (T1) 400*d* of the last registered maintenance performed on the ATM 104-2 may indicate a date and time when software updates were performed on the ATM 104-2 as part of software maintenance, date and time a battery pack was replaced, or date and time when component 194 was replaced, and/or date and time when funds were replenished at the ATM 104-2, although any other type of maintenance related operations may also be included. The node resource data value 400*e* indicates the data value associated with the amount of resources available at the ATM 104-2. For example, 400*e* indicates the amount of cash available at the ATM 104-2 is $1000. The format identifier 400*n* indicates a data format (F1) of the resource status message 400. For example, 400*n* indicates that the resource status message 400 is in a first format (F1) of eXtensible Markup Language (XML) file format. In another example, the format identifier 400*n* may include other data formats such as a JavaScript Object Notation (JSON) file format and/or Yet Another Markup Language (YAML) file format. Although, any other file formats may also be included.

Further, the node location identifier 400*c*, which indicates the geographical location of ATM 104-2, is a software code in the first format (F1) associated with the resource status message 400. For example, see FIG. 5C, the node location identifier 400*c* represents the geographical location of ATM 104-2 as a software code embedded within the resource status message 400.

Upon receiving the resource status message 400, server device 114 determines if the resource status indicator 400*a* includes a warning status. For example, when the resource status indicator 400*a* indicates that the amount of funds (available cash) available at ATM 104-2 has gone below a threshold value, then it is determined that the resource status indicator is a warning status. The warning status indicates that a data value associated with a resource of ATM 104-2 is below a threshold value.

Figure 5A:
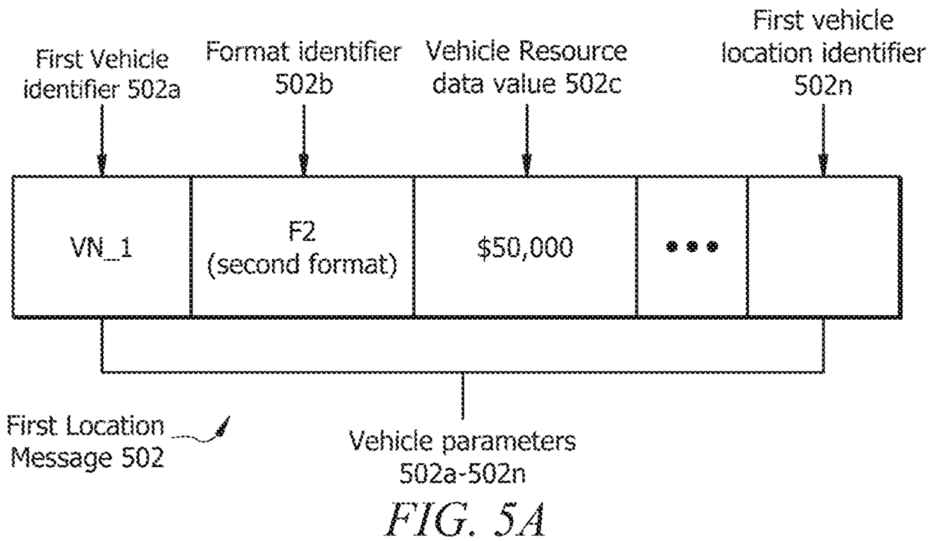
FIG. 5A illustrates a first vehicle location message in accordance with one or more embodiments of the present disclosure.

Transmit a Location Request and Receive First and Second Vehicle Location Messages (FIGS. 5A-5)

In response to determining that the resource status indicator 400*a* includes a warning status, server device 114 electronically transmits a location request (LR1), via the network 116, to a plurality of service provider vehicles 198-1 to 198-3 included in the vehicle edge network 198. The location request (LR1) may be a broadcast message sent to each of the plurality of service provider vehicles 198-1 to 198-3, requesting location information of the plurality of service provider vehicles 198-1 to 198-3. The plurality of service provider vehicles 198-1 to 198-3 provides services to remedy the warning status associated with the resource of the ATM 104-2. In this embodiment, server device 114 transmits the location request (LR1) to a first service provider vehicle 198-1 and a second service provider vehicle 198-2.

In response to transmitting the location request (LR1) to the first service provider vehicle 198-1, server device 114 electronically receives a first vehicle location message 502 in a second format from the first service provider vehicle 198-1. With reference to FIG. 5A, the first vehicle location message 502 includes a first vehicle identifier 502*a*, a format identifier 502*b*, vehicle resource data value 502*e*, and the first vehicle location identifier 502*n* of the first service provider vehicle 198-1. The first vehicle identifier 502*a* uniquely identifies the first service provider vehicle 198-1, and the format identifier 502*b* indicates a data format (F2) of the first location message 502. For example, 502*b* indicates that the first location message 502 is in a second format (F2) of JavaScript Object Notation (JSON) file format. In another example, the format identifier 502*b* may include other data formats such as an eXtensible Markup Language (XML) and/or Yet Another Markup Language (YAML) file format. Although, any other file formats may also be included. Vehicle resource data value 502*c* may indicate data value associated with an amount of resource available at the first service provider vehicle 198-1. For example, 502*c* indicates the amount of cash (i.e., a first amount of resource data value 502*c*) available at the first service provider vehicle 198-1 is $50,000. The first vehicle location identifier 502*n* provides geolocation information of the first service provider vehicle 198-1 based on a GPS system associated with the first service provider vehicle 198-1. For example, concerning FIG. 5C, the first vehicle location identifier 502*n* represents the geographical location of the first service provider vehicle 198-1 as a software code embedded within the first location message 502.

Figure 5B:
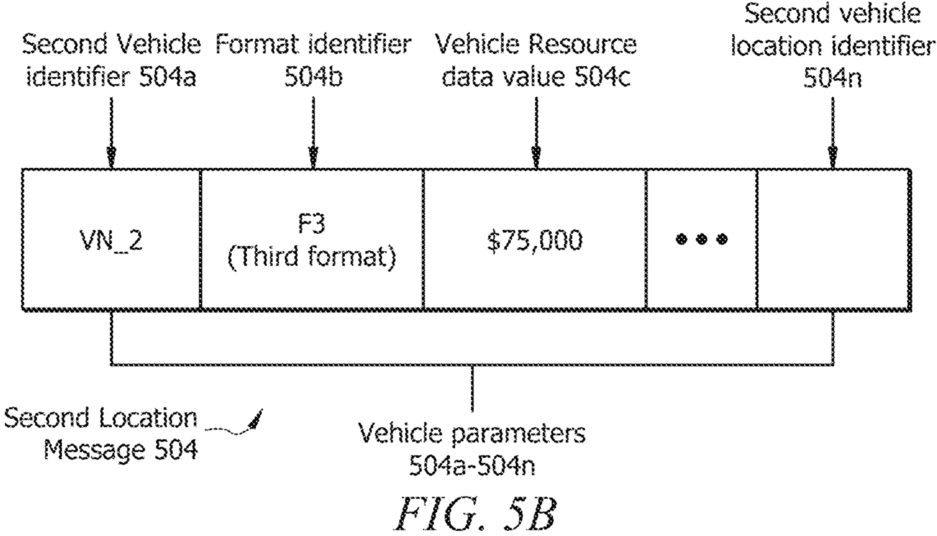
FIG. 5B illustrates a second vehicle location message in accordance with one or more embodiments of the present disclosure.

In response to transmitting the location request (LR1) to the second service provider vehicle 198-2, server device 114 electronically receives a second vehicle location message 504 in a third format from the second service provider vehicle 198-2. With reference to FIG. 5B, the second vehicle location message 504 includes a second vehicle identifier 504*a*, a format identifier 504*b*, vehicle resource data value 502*c*, and the second vehicle location identifier 504*n* of the second service provider vehicle 198-2. The second vehicle identifier 504*a* uniquely identifies the second service provider vehicle 198-2, the format identifier 504*b* indicates a data format (F3) of the second location message 504. For example, 504*b* indicates that the second location message 504 is in a third format (F3) of Yet Another Markup Language (YAML) file format. In another example, the format identifier 504*b* may include other data formats such as an eXtensible Markup Language (XML) and/or JavaScript Object Notation (JSON) file format. Although, any other file formats may also be included. Vehicle resource data value 504*c* may indicate data value associated with an amount of resource available at the second service provider vehicle 198-2. For example, 504*c* indicates the amount of cash (i.e., a second amount of resource data value 504*c*) available at the second service provider vehicle 198-2 is $75,000. The second vehicle location identifier 504*n* provides geolocation information of the second service provider vehicle 198-2 based on a GPS system associated with the second service provider vehicle 198-2. For example, see FIG. 5C, the second vehicle location identifier 504*n* represents the geographical location of the second service provider vehicle 198-2 as a software code embedded within the second location message 504.

The second format (F2) and the third format (F3) are different formats, and each of the second format (F2) and the third format (F3) are incompatible with the first format (F1) of the resource status message. For example, the first format (F1) is an eXtensible Markup Language (XML) file format, the second format (F2) is an JavaScript Object Notation (JSON) file format, and the third format (F3) is an Yet Another Markup Language (YAML) file format.

The processor 134 of the server device 114 determines if the received format identifiers (e.g., F1, F2, and F3) are compatible with each other based on comparing the format identifiers (e.g., comparing F1 and F2, and comparing F1 and F3). For example, processor 134 determines if received format identifiers F1 and F2 are the same; if F1 and F2 are the same, then the formats F1 and F2 are compatible with each other. However, if F1 and F2 are different, then the formats F1 and F2 are not compatible with each other. For example, if F1 and F2 are both (e.g., an XML file format), then F1 and F2 are compatible with each other. However, if F1 is a first format (e.g., XML file format) and F2 is a second format (e.g., JSON file format), then F1 and F2 are not compatible with each other. Another example is if F1 and F3 are both (e.g., an XML file format), then F1 and F3 are compatible with each other. However, if F1 is a first format (e.g., XML file format) and F3 is a second format (e.g., YAML file format), then F1 and F3 are not compatible with each other.

Processor 134 determines if the second format (F2) of the first vehicle location message 502 and the third format (F3) of the second vehicle location message 504 are compatible with the first format (F1) of the resource status message 400 based on matching the second format identifier (JSON file format) and the third format identifier (YAML file format) with the first format identifier (XML file format). When none of the format identifiers (F1, F2, and F3) are the same, then processor 134 determines that the second format (F2) of the first vehicle location message 502 and the third format (F3) of the second vehicle location message 504 are incompatible with the first format (F1) of the resource status message 400.

Figure 5C:
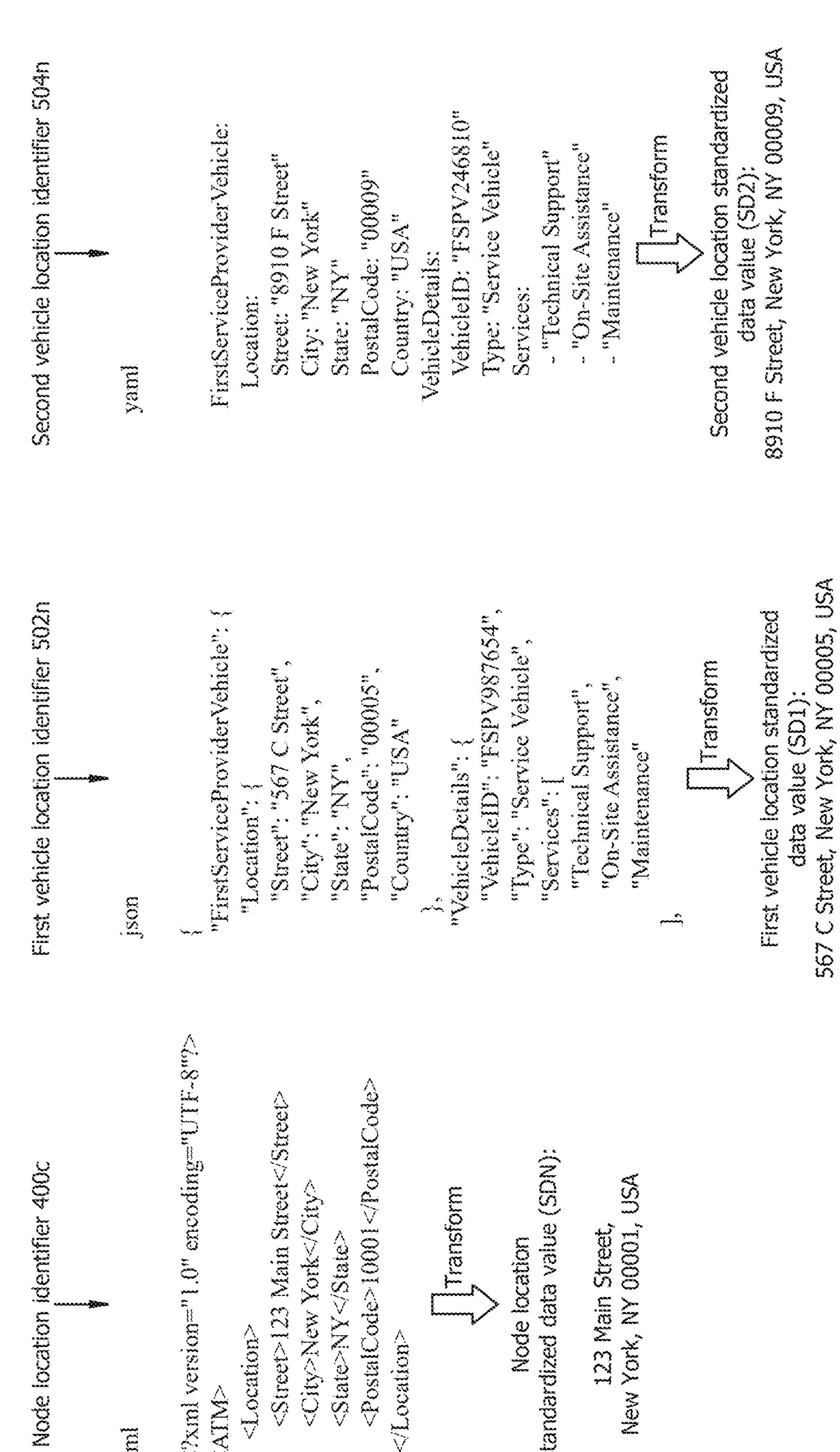
FIG. 5C illustrates a generation of a first standardized data value, a second standardized data value, and a third standardized data value in accordance with one or more embodiments of the present disclosure.

Transform and Generate Standardized Data Values (FIG. 5C)

First Format (F1), Second Format (F2), and Third Format (F3) are Incompatible with Each Other In this embodiment, each of the first format (F1), second format (F2), and third format (F3) are different formats, and thus the second format (F2) and the third format (F3) are incompatible with the first format (F1) of the resource status message.

The second vehicle location identifier 504*n* indicates the geographical location of the second service provider vehicle 198-2, which is a software code in the third format (F3) associated with the second vehicle location message 504. For example, with reference to FIG. 5C, the second vehicle location identifier 504*n* represents the geographical location of the second service provider vehicle 198-2, as a software code embedded within the second vehicle location message 504. Further, the first vehicle location identifier 502*n* indicates the geographical location of the first service provider vehicle 198-1, which is a software code in the second format (F2) associated with the first vehicle location message 502. For example, with reference to FIG. 5C, the first vehicle location identifier 502*n* represents the geographical location of the first service provider vehicle 198-1, as a software code embedded within the first vehicle location message 502. Further, the second vehicle location identifier 504*n*, indicates the geographical location of the second service provider vehicle 198-2, is a software code in the third format (F3) associated with the second vehicle location message 504. For example, with reference to FIG. 5C, the second vehicle location identifier 504*n* represents the geographical location of the second service provider vehicle 198-2, as a software code embedded within the second vehicle location message 504.

FIG. 5C, shows, server device 114 utilizes an AI algorithm 145*a* to transform the geolocation information included in the node location identifier 400*c* (in a first format (F1)) associated with the ATM 104-2 included in the resource status message 400 to generate a node location standardized data value (SDN) (e.g., SDN is 123 Main Street, New York, NY 00001, USA) corresponding with the node location identifier of the computing node. AI algorithm 145*a* may include a plurality of AI algorithms 145*a*. Server device 114 is configured to utilize the AI algorithm 145*a* (e.g., a Naïve Bayes classification algorithm or any other artificial intelligence algorithm) that is trained to extract geographical coordinate location included within a message (e.g., resource status message 400) in the first format (F1), the second format (F2), and/or the third format (F3).

Training the AL Algorithm 145*a* to Transform Data

The AI algorithm 145*a* is first trained using two sets of training data. The first set of training data utilized to train the AI algorithm 145*a* includes a first labeled dataset of a plurality of software codes associated with location identifiers. The labels are assigned to parts of the software code that indicate geographical data (city name, street name, zip code, etc.) within the software code associated with location identifiers. Further, the first labeled dataset of software codes may include any type of data file format (e.g., first format (F1), second format (F2), third format (F3)). The first set of training data also includes an unlabeled dataset of a plurality of software codes. This unlabeled dataset includes the software code with geographical data as well as non-geographical data (e.g., computing node identifier 400*b*, timestamp (T1) 400*d*, node resource data value 400*e*, etc). The AI algorithm 145*a* is trained in a first training stage using the first labeled dataset and the second unlabeled dataset to distinguish and identify the geographical location in the first format, second format, and third format. As part of the first training stage, the server device 118 creates a second set of training data that includes software codes with the non-geographical data from the unlabeled dataset, that are incorrectly detected to include geographical data. The second set of training data is created as an output of the first training stage. The second set of training data is then input to the AI algorithm 145*a* along with the first labeled dataset to retrain the AI algorithm 145*a*. Once the AI algorithm 145*a* is trained to a threshold level of accuracy of identifying geographical location from software codes in, for example, the first format, second format, and third format, then the AI algorithm 145*a* is determined to be a trained AL algorithm 145*a*.

The server device 114 executes the trained AI algorithm 145*a* to transform the geolocation information included in the node location identifier 400*c* (in a first format (F1)) associated with the ATM 104-2 included in the resource status message 400 to generate a node location standardized data value (SDN) (e.g., SDN is 123 Main Street, New York, NY 00001, USA). The standardized data value (SDN) includes only the geographical data associated with the node location identifier 400*c* without the software code included in the node location identifier 400*c*. Similar to transforming the geolocation information associated with the node location identifier 400*c* associated with the ATM 104-2 to generate the node location standardized data value (SDN), the server device 114 executes the trained AI algorithm 145*a* to transform the geolocation information associated with the first vehicle location identifier 502*n* (in a second format (F2)) included in the first vehicle location message 502 to generate a first vehicle location standardized data value (SD1) (e.g., SD1 is 567 C Street, New York, NY 00005, USA). Additionally, the system executes the AI algorithm 145*a* to transform the geolocation information associated with the second vehicle location identifier 504*n* (in a third format F3) included in the second vehicle location message 504 to generate a second vehicle location standardized data value (SD2) (e.g., SD2 is 8910 F Street, New York, NY 00009, USA).

Generate Standardized Location Dataset Table (FIG. 6)

Upon generating the node location standardized data value (SDN), the first vehicle location standardized data value (SD1), and the second vehicle location standardized data value (SD2). The server device 114 then generates a standardized location dataset table 150, including the node location standardized data value (SDN), the first vehicle location standardized data value (SD1), and the second vehicle location standardized data value (SD2). The standardized location dataset table 150 represents a table including an identifier of the computing node identifier (e.g., 400*b*) associated with ATM 104-2 (e.g., CN_02), resource status indicator (e.g., warning status 400*a*) associated with the resource status message (e.g., resource status message 400), an identifier associated with the service provider vehicles (e.g., VN_1 associated with first service provider vehicle 198-1, VN_2 associated with second service provider vehicle 198-2), the node location standardized data value SDN, first vehicle location standardized data value (SD1), the second vehicle location standardized data value (SD2), and distance of each of the service provider vehicles (e.g., 198-1 & 198-2) from the computing node 104-2 (i.e., ATM 104-2).

Training the AI Algorithm 145*b* to Recognize Standardized Location Dataset Table 150

Processor 134 collects a set of documents from a documents database (not shown). Each document of the set of documents includes one or more table structures. For example, each document may be a journal, an article, a news webpage, or any digital document including table structures. Processor 134 applies one or more annotations to the one or more table structures included in each of the documents to create a modified set of documents. One or more annotations indicate one or more elements of the table structures and text included within the elements. One or more elements include individual cells associated with the table structures, rows associated with the table structures, columns associated with the table structures, and headers associated with the table structures. Processor 134 then creates a first training set comprising the collected set of documents, the modified set of documents, and a set of documents including non-table content. The non-table content includes text paragraphs and images. Next, processor 134 trains the AI algorithm 145*b* in a first stage using the first training set to detect one or more elements of the table and to recognize and extract text from individual cells in the table structures. The AI algorithm 145*b* may be any text recognition algorithm (e.g., a Table OCR algorithm). Processor 134 then creates a second training set for a second stage of training. The second training set includes the first training set and documents that are incorrectly detected to include text within the tables after the first stage of training. Processor 134 then retrains the AI algorithm 145*b* in a second stage using the second training set, to generate a trained AL algorithm 145*b*. Once the AI algorithm 145*b* is trained to a threshold level of accuracy, the AI algorithm 145*b* is applied to the standardized location dataset table 150 to detect one or more elements of the table and to extract (i.e., recognize) text from individual cells of the table structures.

The processor 134 executes the trained AI algorithm 145*b* with the standardized location dataset table 150 as input to determine as an output the node location standardized data value (SDN) associated with the node location identifier 400*c*, the first vehicle location standardized data value (SD1) associated with the first vehicle location identifier 502*n*, and the second vehicle location standardized data value (SD2) associated with the second vehicle location identifier 504*n*. The trained AI algorithm 145*b* is trained to recognize text data (e.g., CN_02, VN_1, VN_2, VN_3, SDN, SD1, SD2, SD3) from the standardized location dataset table 150. For example, recognized text data may include the node location standardized data value (SDN), the first vehicle location standardized data value (SD1), and the second vehicle location standardized data value (SD2).

Determine a First Distance and a Second Distance Based on a Comparison

Upon determining the node location standardized data value (SDN), the first vehicle location standardized data value (SD1), and the second vehicle location standardized data value (SD2) by applying the AI algorithm 145*b*, processor 134 of the server device 114 compares the first vehicle location standardized data value SD1 (e.g., SD1 is 567 C Street, New York, NY 00005, USA) associated with the first service provider vehicle with the node location standardized data value SDN (e.g., SDN is 123 Main Street, New York, NY 00001, USA) to determine a first distance D1 (e.g., 300 meters). The comparison is performed by identifying a geographical coordinate location associated with SD1 and comparing it with the geographical coordinate location associated with SDN. The first distance (D1) represents the distance between the first service provider vehicle 198-1 and the ATM 104-2. The system similarly compares SD2 and SDN and determines the second distance D2 (e.g., 500 meters), which represents the distance between the second service provider vehicle 198-2 and the ATM 104-2.

The processor 134 of the server device 114 then compares the first distance D1 with the second distance D2 to determine the shortest distance to the ATM 104-2. Based on comparing the first distance D1 (e.g., 300 meters) associated with the first vehicle location standardized data value "SD1" corresponding with the first vehicle provider vehicle 198-1 and the second distance D2 (e.g., 500 meters) associated with the second vehicle location standardized data value "SD2" corresponding with the second vehicle provider vehicle 198-2, the processor 134 of the server device 114 identifies the first distance D1 (e.g., 300 meters is shorter than 500 meters) associated with the first service provider vehicle 198-1 as the shortest distance to the ATM 104-2.

Transmit a Remedy Task Notification

The processor 134 of the server device 114 then transmits a remedy task notification to the first service provider vehicle 198-1, identified to have the shortest distance D1 to the ATM 104-2 at a first remedy time period (RTP). The remedy task notification identifies services to remedy the warning status 400*a* (e.g., low backup power, outdated software, or low cash) by manually servicing the ATM 140-2 with the required resources. The task remedy notification includes the location information of ATM 104-2 and services to be provided in association with the operational level of the resource of ATM 104-2 (e.g., for a low on cash ATM 104-2, reload the ATM 104-2 with cash or at ATM 104-2 change battery backup power component 194 with a new battery backup power or physically update a software program of the ATM 104-2).

The processor 134 of the server device 114 upon transmitting the remedy task notification to the identified first service provider vehicle 198-1 at the first remedy time period (RTP) (e.g., 01:15 PM), processor 134 determines if the first distance D1 (e.g., 300 meters) between the first service provider vehicle 194-1 and the ATM 104-2 has reduced by a threshold distance value (e.g., 100 meters) at a second time period after the first time period (e.g., 1 hour after 01:15 PM).

The processor 134 of the server device 114 upon determining that the first distance D1 (e.g., 300 meters) between the first service provider vehicle 198-1 and the ATM 104-2 has reduced by the threshold distance value (e.g., 100 meters) at the second time period after the first time period (e.g., 1 hour after 01:15 PM), then processor 134 transmits a service initiation signal to the ATM 104-2 to place the ATM 104-2 into a service mode as part of initiating a remedy operation to fix the warning status 400*a* associated with the resource of the ATM 104-2. Transmission of the service initiation signal to the ATM 104-2 results in the ATM 104-2 going into a service mode. In the service mode, the operations associated with certain components 194 (e.g., a user interface of the ATM 104-2 or printer of the ATM 104-2) may be disabled. When in the service mode, other operations associated with the ATM 104-2 may also be disabled, such as, dispensing cash may be disabled. When operations of dispensing cash are disabled, the ATM 104-2 in the service mode may display a notification on the user interface that ATM 104-2 may only be functional to check account details (e.g., fund available). When in service mode, ATM 104-2 may be rebooted or restarted to initiate the remedy operation before the first service provider, vehicle 198-1, arrives.

Further, in response to determining that the first distance D1 between the first service provider vehicle 198-1 and the ATM 104-1 has not reduced by the threshold distance value (e.g., 100 meters) at the second time period after the first time period (e.g., 1 hour after 01:15 PM), then processor 134 transmit a second notification to the identified second service provider vehicle 198-2, wherein the second notification assigns the task to the second service provider vehicle 198-2 to identify services to remedy the warning status 400*a*.

Further, in response to determining that the first distance D1 between the first service provider vehicle 198-1 and the ATM 104-2 has reduced by the threshold distance value (e.g., 100 meters) at the second time period after the first time period (e.g., 1 hour after 01:15 PM), processor 134 initiates installation of an updated version of a software program at the ATM 104-2 as part of a remedy operation to fix the warning status 400*a* associated with the resource of the ATM 104-2.

First Format (F1), Second Format (F2), and Third Format (F3) are Compatible with Each Other In another embodiment, when processor 134 of the server device 114 determines that the second format identifier (e.g., JSON file format) and the third format identifier (e.g., JSON file format) both match the first format identifier (e.g., JSON file format), then processor 134 determine that the second format (F2) of the first vehicle location message 502 and the third format (F3) of the second vehicle location message 504 are both compatible with the first format (F1) of the resource status message 400.

Processor 134, upon determining that the first format (F1), the second format (F2), and the third format (F3) are compatible with each other, applies an extraction algorithm (e.g., a JSON extraction algorithm) to the resource status message 400, the first vehicle location message 502, and the second vehicle location message 504 simultaneously. Extract a first data value (e.g., a geographical coordinate location associated with 123 Main Street, New York, NY 00001, USA) associated with the node location identifier 400*c* from the resource status message 400, extracts a second data value (e.g., a geographical coordinate location associated with 567 C Street, New York, NY 00005, USA) associated with the first vehicle location identifier (502*n*) from the first vehicle location message 502, and extracts a third data value (e.g., a geographical coordinate location associated with 8910 F Street, New York, NY 00009, USA) associated with the second vehicle location identifier 198-2 from the second vehicle location message 504.

Processor 134 then compares the first data value (e.g., a geographical coordinate location associated with 123 Main Street, New York, NY 00001, USA) associated with the node location identifier 400*c* and the second data value (e.g., a geographical coordinate location associated with 567 C Street, New York, NY 00005, USA) associated with the first vehicle location identifier 502*n* to determine the first distance D1 between the first service provider vehicle 198-1 and the ATM 104-2. Processor 134 then compares the first data value (e.g., a geographical coordinate location associated with 123 Main Street, New York, NY 00001, USA) associated with the node location identifier 400*c* and the third data value (e.g., a geographical coordinate location associated with 8910 F Street, New York, NY 00009, USA) associated with the second vehicle location identifier 198-2 to determine the second distance D2 between the second service provider vehicle 198-2 and the ATM 104-2.

Processor 134 identifies the first distance D1 between the first service provider vehicle 198-1 and the ATM 104-2 as the shortest distance to the ATM 104-2 based on comparing the first distance D1 and the second distance D2. Processor 134 then transmits a remedy task notification to the first service provider vehicle 198-1 identified to have the shortest distance D1 to the ATM 104-2. The remedy task notification identifies services to remedy the warning status 400*a*.

First Format (F1) and Second Format (F2) are Compatible and First Format (F1) and Third Format (F3) are not Compatible with Each Other In another embodiment, when processor 134 of the server device 114 determines that the first format identifier (e.g., JSON file format) and the second format identifier (e.g., JSON file format) are the same and hence the first format and the second format are compatible with each other. Further, processor 134 also determines that the first format identifier (JSON file format) of the first vehicle location message 502 and the third format identifier (YAML file format) of the second vehicle location message 504 are not the same and hence the first format and the third format are not compatible with each other.

Processor 134, upon determining that the first format and the second format are compatible with each other, applies an extraction algorithm (e.g., a JSON extraction algorithm) to the resource status message 400, the first vehicle location message 502, to extract a first data value (e.g., a geographical coordinate location associated with 123 Main Street, New York, NY 00001, USA) associated with the node location identifier 400*c* from the resource status message 400, and extract a second data value (e.g., a geographical coordinate location associated with 567 C Street, New York, NY 00005, USA) associated with the first vehicle location identifier 502*n* from the first vehicle location message 502.

Processor 134 then compares the first data value (e.g., a geographical coordinate location associated with 123 Main Street, New York, NY 00001, USA) associated with the node location identifier 400*c* and the second data value (e.g., a geographical coordinate location associated with 567 C Street, New York, NY 00005, USA) associated with the first vehicle location identifier 502*n* to determine the first distance D1 between the first service provider vehicle 198-1 and the ATM 104-2.

Processor 134, upon determining that the third format (F3) of the second vehicle location message 504 is incompatible with the first format (F1) of the resource status message 400, executes the AI algorithm 145*a* to transform the node location identifier 400*c* in a first format (f1) from the resource status message 400 to the node location standardized data value SDN (as explained above). Further, processor 134 executes the AI algorithm 145*a* to transform the second vehicle location identifier 504*n* from the second vehicle location message 504 in the third format (F3) to the second vehicle location standardized data value (SD2) (as explained earlier).

Processor 134 then generates the standardized location dataset 150, including only the node location standardized data value (SDN) and the second vehicle location standardized data value (SD2). Further, processor 134 executes the AI algorithm 145*b* with the standardized location dataset 150 as input to determine the text data associated with the node location standardized data value (SDN) (e.g., 567 C Street, New York, NY 00005, USA) and text data associated with the second vehicle location standardized data value (SD2) (e.g., a geographical coordinate location associated with 8910 F Street, New York, NY 00009, USA) as the output.

Processor 134 compares the node location standardized data value (SDN) (e.g., e.g., a geographical coordinate location associated with 123 Main Street, New York, NY 00001, USA) associated with the node location identifier 400*c* and the second vehicle location standardized data value (SD2) (e.g., a geographical coordinate location associated with 8910 F Street, New York, NY 00009, USA) associated with the second vehicle location identifier 504*n* to determine the second distance D2 between the second service provider vehicle 198-2 and the ATM 104-2.

Processor 134 then identifies the first distance (D1) between the first service provider vehicle 198-1 and the ATM 104-2 as the shortest distance to the ATM 104-2 based on comparing the first distance D1 and the second distance D2.

Processor 134 then transmits the remedy task notification to the first service provider vehicle 198-1 identified to have the shortest distance to the ATM 104-2, wherein the remedy task notification identifies services to remedy the warning status 400*a*.

In another embodiment, when processor 134 determines the first distance D1 is equal to the second distance D2 based on comparing the first distance D1 and the second distance D2, then processor 134 extracts a first amount of vehicle resource data value 502*c* (e.g., $50, 000) included in the first vehicle location message 502. Further, processor 134 extracts a second amount of resource data value 504*c* (e.g., $75,000) included in the second vehicle location message 504. Processor 134 compares the first amount of resource data value 502*c* and the second amount of resource data value 504*c* to determine a highest resource data value. Based on the comparison processor 134 determines that the second amount of resource data value 504*c* is greater than the first amount of resource data value 502*c* and thus transmits a second notification to the second service provider vehicle 198-2 determined to have the second amount of resource data value 504*c* (e.g., $75,000 i.e., highest resource data value). The second notification assigns a second task to the second service provider vehicle 198-2 to identify services to remedy the warning status 400*a* associated with the resource of the ATM 104-2.

Example Method 700

Figure 7:
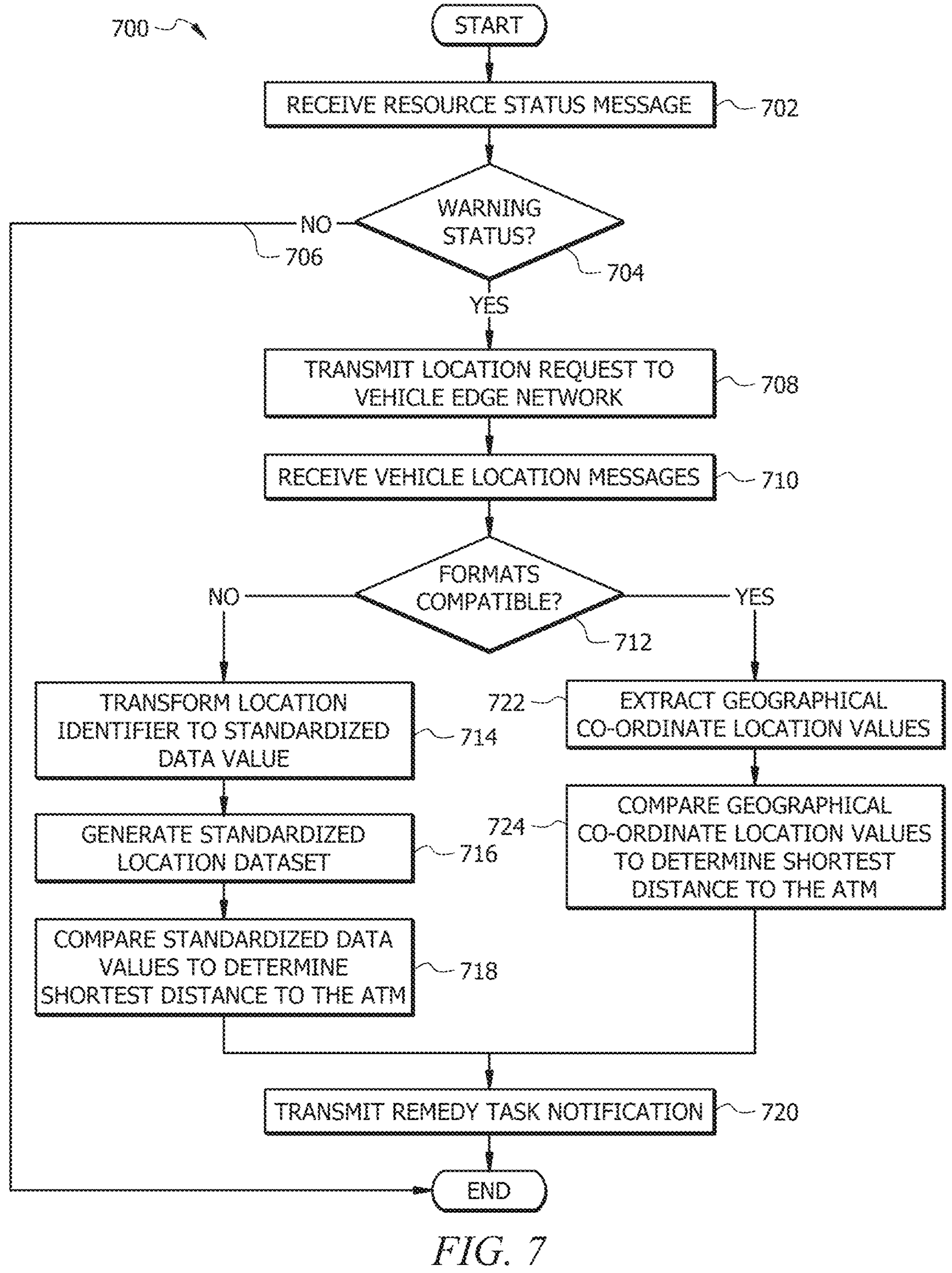
FIG. 7 illustrates an example flowchart of a method of the system of FIG. 1 for location-based monitoring of computing node parameters based on sensor data.

Processor 134 may be configured to perform one or more operations of the operational flow 700, as described in FIG. 7. In some embodiments, with reference to FIGS. 4-7, the processor 134 executes software instructions 140 to perform one or more operations associated with location-based monitoring of computing node parameters 400*a*-400*n* associated with one or more computing nodes 104.

Referring to FIG. 7, at operation 702, processor 134 of the server device 114 electronically receives the resource status message 400 from ATM 104-2 may include a resource status indicator 400*a* and one or more resource parameters 400*b*-400*n*. Further, the resource status message 400 includes a format identifier 400*n*, which indicates a data format (F1) of the resource status message 400. For example, 400*n* indicates that the resource status message 400 is in a first format (F1) of eXtensible Markup Language (XML) file format.

At operation 704, processor 134 of server device 114 determines if the received resource status message 400 includes a warning status 400*a* indicator. When it is determined that the resource status message 400 does not include the warning status 400*a* (i.e., resource status message 400 includes a "normal status"), the operational flow takes the No branch to step 706, and the method ends here.

However, back at step 704, when it is determined that the resource status message 400 includes the warning status 400*a*, the operational flow takes the Yes branch to step 708.

At operation 708, processor 134 electronically transmits a location request (LR1), via the network 116, to a plurality of service provider vehicles 198-1 to 198-3 included in the vehicle edge network 198. The location request (LR1) may be a broadcast message sent to each of the plurality of service provider vehicles 198-1 to 198-3, requesting location information of the plurality of service provider vehicles 198-1 to 198-3.

At operation 710, processor 134 of server device 114 electronically receives a first vehicle location message 502 in a second format from the first service provider vehicle 198-1 and also electronically receives a second vehicle location message 504 in a third format from the second service provider vehicle 198-2. With reference to FIG. 5A, the first vehicle location message 502 includes a format identifier 502*b* that indicates a data format (F2) of the first location message 502. For example, 502*b* indicates that the first location message 502 is in a second format (F2) of JavaScript Object Notation (JSON) file format. With reference to FIG. 5B, the second vehicle location message 504 includes a format identifier 504*b* that indicates a third format (F3) of Yet Another Markup Language (YAML) file format.

At operation 712, processor 134 of server device 114 determines if the received format identifiers (e.g., F1, F2, and F3) are compatible with each other based on comparing the format identifiers (e.g., comparing F1 and F2, and comparing F1 and F3). For example, the first format (F1) is an eXtensible Markup Language (XML) file format, the second format (F2) is an JavaScript Object Notation (JSON) file format, and the third format (F3) is an Yet Another Markup Language (YAML) file format. Processor 134 determines if the received format identifiers F1 and F2 are the same, since, in this example, F1 (is (XML) file format) and F2 (is (JSON) file format), thus F1 and F2 are different, hence the formats F1 and F2 are not compatible with each other. Further, since F1 is a first format (e.g., XML file format) and F3 is a second format (e.g., YAML file format), then F1 and F3 are different and hence are not compatible with each other. In this embodiment, each of the first format (F1), second format (F2), and third format (F3) are different formats, and thus the second format (F2) and the third format (F3) are incompatible with the first format (F1) of the resource status message. Thus, upon determining that F1, F2, and F3 are incompatible with each other, the operation takes the No branch to step 714.

At operation 714, processor 134 of server device 114 executes the trained AI algorithm 145*a* to transform the node location identifier 400*c* (in a first format (F1)) associated with the ATM 104-2 to generate a node location standardized data value (SDN) (e.g., SDN is 123 Main Street, New York, NY 00001, USA) and transforms the geolocation information associated with the first vehicle location identifier 502*n* (in a second format (F2)) included in the first vehicle location message 502 to generate a first vehicle location standardized data value (SD1) (e.g., SD1 is 567 C Street, New York, NY 00005, USA), and further transform the geolocation information associated with the second vehicle location identifier 504*n* (in a third format F3) included in the second vehicle location message 504 to generate a second vehicle location standardized data value (SD2) (e.g., SD2 is 8910 F Street, New York, NY 00009, USA).

At operation 716, processor 134 of server device 114 generates a standardized location dataset table 150, including the node location standardized data value (SDN), the first vehicle location standardized data value (SD1), and the second vehicle location standardized data value (SD2).

At operation, 718, executes the trained AI algorithm 145*b* with the standardized location dataset table 150 as input to determine as an output the node location standardized data value (SDN) associated with the node location identifier 400*c*, the first vehicle location standardized data value (SD1) associated with the first vehicle location identifier 502*n*, and the second vehicle location standardized data value (SD2) associated with the second vehicle location identifier 504*n*. Processor 134 then compares the first vehicle location standardized data value SD1 and SDN to determine a first distance D1 (e.g., 300 meters), which represents the distance between the first service provider vehicle 198-1 and the ATM 104-2. and further compares SD2 and SDN to determine the second distance D2 (e.g., 500 meters), which represents the distance between the second service provider vehicle 198-2 and the ATM 104-2. The processor 134 of the server device 114 then compares the first distance D1 with the second distance D2 to determine the shortest distance to the ATM 104-2 and identifies the first distance D1 (e.g., 300 meters is shorter than 500 meters) associated with the first service provider vehicle 198-1 as the shortest distance to the 104-2.

At operation 720, processor 134 of the server device 114 then transmits a remedy task notification to the first service provider vehicle 198-1, identified to have the shortest distance D1 to the ATM 104-2.

Back at operation 712, processor 134 determines that when F1 and F2 are compatible with each other, and F1 and F3 are compatible with each other, the operation takes the Yes branch to step 722.

At operation 722, processor 134 applies an extraction algorithm (e.g., a JSON extraction algorithm) to the resource status message 400, to the first vehicle location message 502, and to the second vehicle location message 504 simultaneously.

At operation 724, processor 134 then compares the geographical coordinate location (e.g., corresponding with 123 Main Street, New York, NY 00001, USA) associated with the node location identifier 400*c* and the geographical coordinate location (e.g., 567 C Street, New York, NY 00005, USA) associated with the first vehicle location identifier 502*n* to determine the first distance D1 between the first service provider vehicle 198-1 and the ATM 104-2. Processor 134 then compares the geographical coordinate location (e.g., corresponding with 123 Main Street, New York, NY 00001, USA) associated with the node location identifier 400*c* and the geographical coordinate location (e.g., corresponding with 8910 F Street, New York, NY 00009, USA) associated with the second vehicle location identifier 198-2 to determine the second distance D2 between the second service provider vehicle 198-2 and the ATM 104-2. The operational flow then proceeds to step 720. At step 720 processor 134 transmits a remedy task notification to the first service provider vehicle 198-1, identified to have the shortest distance D1 to the ATM 104-2 and the method 700 ends here.

In some embodiments, the one or more operations of the operational flow 700, as described in FIG. 7 may be performed along with one or more operations of the operational flow 300, as described in FIG. 3.

While several embodiments have been provided in the present disclosure, it should be understood that the system 100 and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented. In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein. To aid the Patent Office, and any readers of any patent issued on this application in interpreting the claims appended hereto, applicants note that they do not intend any of the appended claims to invoke 35 U.S.C. § 112(f), as it exists on the date of filing hereof, unless the words "means for" or "step for" are explicitly used in the particular claim.

The invention claimed is:

1. A system comprising:

a memory operable to store an artificial intelligence (AI) algorithm, a historical events dataset, and a rules dataset, wherein the historical events dataset comprises a list of known fault event identifiers and a plurality of execution criteria, and the rules dataset includes one or more rules to identify a first set of procedures to fix an anomalous operation performed at a computing node; and a processor operably coupled to the memory and configured to:

receive, from a computing node, a fault event message, wherein the fault event message comprises a fault event identifier and one or more computing node parameters, wherein the fault event identifier is associated with the anomalous operation performed at the computing node;

determine whether the received fault event identifier is a known fault event identifier based at least in part upon determining if the received fault event identifier is included in the list of known fault event identifiers stored in the historical events dataset;

in response to determining that the received fault event identifier is not a known fault event identifier, execute the AI algorithm to:

identify the first set of procedures based at least in part on a data value associated with the one or more computing node parameters not exceeding a predefined threshold value, wherein the first set of procedures includes a first potential faulty operation and a corresponding first potential remedy action, and a second potential faulty operation and a corresponding second potential remedy action, wherein the AI algorithm is trained based on the rules dataset that includes one or more rules to identify the first set of procedures, wherein one of the rules defines identifying the first set of procedures when the data value associated with the one or more computing node parameters does not exceed a predefined threshold value;

identify a sequential order of execution of the identified first potential remedy action and the second potential remedy action based on at least one of a plurality of execution criteria stored in the historical events dataset, wherein the one of the plurality of execution criteria includes past number of successful fix data associated each of the first potential remedy action and the second potential remedy action, wherein the identified sequential order first executes the first potential remedy action, followed by the second potential remedy action;

sequentially execute, on the computing node, the first potential remedy action;

determine whether the executed first potential remedy action fixes the anomalous operation associated with the computing node;

in response to determining that the executed first potential remedy action does not fix the anomalous operation associated with the computing node, sequentially execute, on the computing node, the second potential remedy action;

determine whether the executed second potential remedy action fixes the anomalous operation associated with the computing node;

in response to determining that the executed second potential remedy action does fix the anomalous operation associated with the computing node, transmit a successful fix notification to the computing node; and input the received fault event identifier and the identified second potential faulty operation and the corresponding second potential remedy action in the historical events dataset to update the historical events dataset.

2. The system of claim 1, wherein the processor is further configured to:

in response to determining that the received fault event identifier is not a known fault event identifier, execute the AI algorithm to:

determine if the one or more computing node parameters is an event type computing node parameter;

in response to determining that the one or more computing node parameters is an event type computing node parameter, access the historical events dataset to identify a second set of procedures to fix the anomalous operation associated with a computing node, wherein the second set of procedures includes a combination of a third set of procedures and a fourth set of procedures, and wherein the third set of procedures is associated with a first known event identifier and includes a third potential faulty operation and a corresponding third potential remedy action, and a fourth potential faulty operation and a corresponding fourth potential remedy action, and wherein the fourth set of procedures is associated with a second known event identifier and includes a fifth potential faulty operation and a corresponding fifth potential remedy action;

identify a second sequential order of execution of the identified third potential remedy action, the fourth potential remedy action, and the fifth potential remedy action based on at least one of the plurality of execution criteria, wherein the one of the plurality of execution criteria includes a number of successful fix data associated each of the third potential remedy action, the fourth potential remedy action, and the fifth potential remedy action, wherein the third potential remedy action is executed first, the fourth potential remedy action is executed second and the fifth potential remedy action is executed last;

sequentially execute, on the computing node, the third potential remedy action;

determine whether the executed third potential remedy action fixes the anomalous operation associated with the computing node;

in response to determining that the executed second potential remedy action does fix the anomalous operation associated with the computing node, transmit the successful fix notification to the computing node; and input the received fault event identifier and the identified third potential faulty operation and the corresponding third potential remedy action in the historical events dataset to update the historical events dataset.

3. The system of claim 1, wherein the processor is further configured to:

in response to determining that the received fault event identifier is not a known fault event identifier, execute the AI algorithm to:

determine if the one or more computing node parameters is an event type computing node parameter;

in response to determining that the one or more computing node parameters is an event type computing node parameter, access a historical computing node events dataset to identify a second set of procedures fix the anomalous operation associated with a computing node, wherein the second set of procedures includes a third potential faulty operation and a corresponding third potential remedy action, and wherein the historical computing node events dataset stores historical remedy actions applied to the computing node over a past time period, and the second set of procedures are included in the historical computing node events dataset;

execute, on the computing node, the third potential remedy action;

determine whether the executed third potential remedy action fixes the anomalous operation associated with the computing node;

in response to determining that the executed second potential remedy action does fix the anomalous operation associated with the computing node, transmit the successful fix notification to the computing node; and input the received fault event identifier and the identified third potential faulty operation and the corresponding third potential remedy action in the historical events dataset to update the historical events dataset.

4. The system of claim 1, wherein the processor is further configured to:

in response to determining that the received fault event identifier is a known fault event identifier, identify a second set of procedures corresponding to the known fault event identifier from a set of historical faulty operations, wherein the second set of procedures includes a third potential faulty operation and a corresponding third potential remedy action, a fourth potential faulty operation and a corresponding fourth potential remedy action, and wherein the second set of procedures in the set of historical faulty operations have been previously identified to be associated with the known fault event identifier;

identify a sequential order of execution of the identified third potential remedy action and the fourth potential remedy action based on at least one of a plurality of execution criteria, wherein the one of the plurality of execution criteria includes past successful remedy actions executed at the computing node, wherein the third potential remedy action is executed first, followed by the fourth potential remedy action;

sequentially execute, on the computing node, the third potential remedy action;

determine whether the executed third potential remedy action fixes the anomalous operation associated with the computing node; and in response to determining that the executed third potential remedy action does fix the anomalous operation associated with the computing node, transmit the successful fix notification to the computing node.

5. The system of claim 1, wherein the processor is further configured to:

in response to determining that the received fault event identifier is not a known fault event identifier, execute the AI algorithm to:

identify a second set of procedures based at least in part on the data value associated with the one or more computing node parameters exceeding the pre-defined threshold value, wherein the second set of procedures includes a third potential faulty operation and a corresponding third potential remedy action, a fourth potential faulty operation and a corresponding fourth potential remedy action, and a fifth potential faulty operation and a corresponding fifth potential remedy action;

identify a second sequential order of execution of the identified third potential remedy action, the fourth potential remedy action, and the fifth potential remedy action based on at least one of the plurality of execution criteria, wherein the one of the plurality of execution criteria includes the number of successful fix data associated each of the third potential remedy action, the fourth potential remedy action, and the fifth potential remedy action, wherein the third potential remedy action is executed first, the fourth potential remedy action is executed second and the fifth potential remedy action is executed last;

sequentially execute, on the computing node, the third potential remedy action;

determine whether the executed third potential remedy action fixes the anomalous operation associated with the computing node;

in response to determining that the executed second potential remedy action does fix the anomalous operation associated with the computing node, transmit the successful fix notification to the computing node; and input the received fault event identifier and the identified third potential faulty operation and the corresponding third potential remedy action in the historical events dataset to update the historical events dataset.

6. The system of claim 1, a processor operably coupled to the memory and configured to:

in response to determining that the executed first potential remedy action does not fix the anomalous operation associated with the computing node, execute the second potential remedy action and transmit a service ticket request to an administrative user device.

7. The system of claim 1, wherein the computing node stores a first software program and a second computing node stores an updated version of the first software program; and the processor is further configured to:

transmit a command, as part of executing the first potential remedy action, to the second computing node to install the updated version of the first software program on the computing node.

8. A method comprising:

receiving, from a computing node, a fault event message, wherein the fault event message comprises a fault event identifier and one or more computing node parameters, wherein the fault event identifier is associated with an anomalous operation performed by the computing node;

determining whether the received fault event identifier is a known fault event identifier based at least in part upon determining if the received fault event identifier is included in a list of known fault event identifiers stored in a historical events dataset;

in response to determining that the received fault event identifier is not a known fault event identifier, identifying, by an AI algorithm, a first set of procedures based at least in part on a data value associated with the one or more computing node parameters not exceeding a predefined threshold value, wherein the first set of procedures includes a first potential faulty operation and a corresponding first potential remedy action, and a second potential faulty operation and a corresponding second potential remedy action, wherein the AI algorithm is trained based on a rules dataset that includes one or more rules to identify the first set of procedures to fix the anomalous operation associated with a computing node, wherein one of the rules defines identifying the first set of procedures when the data value associated with the one or more computing node parameters does not exceed a predefined threshold value;

identifying a sequential order of execution of the identified first potential remedy action and the second potential remedy action based on at least one of a plurality of execution criteria stored in the historical events dataset, wherein the one of the plurality of execution criteria includes past number of successful fix data associated each of the first potential remedy action and the second potential remedy action, wherein the identified sequential order first executes the first potential remedy action, followed by the second potential remedy action;

sequentially executing, on the computing node, the first potential remedy action;

determining whether the executed first potential remedy action fixes the anomalous operation associated with the computing node;

in response to determining that the executed first potential remedy action does not fix the anomalous operation associated with the computing node, sequentially executing, on the computing node, the second potential remedy action;

determining whether the executed second potential remedy action fixes the anomalous operation associated with the computing node;

in response to determining that the executed second potential remedy action does fix the anomalous operation associated with the computing node, transmitting a successful fix notification to the computing node; and inputting the received fault event identifier, the identified second potential faulty operation, and the corresponding second potential remedy action in the historical events dataset to update the historical events dataset.

9. The method of claim 8, further comprising:

in response to determining that the received fault event identifier is not a known fault event identifier, determining, by the AI algorithm, if the one or more computing node parameters is an event type computing node parameter;

in response to determining that the one or more computing node parameters is an event type computing node parameter, accessing the historical events dataset to identify a second set of procedures to fix the anomalous operation associated with a computing node, wherein the second set of procedures includes a combination of a third set of procedures and a fourth set of procedures, and wherein the third set of procedures is associated with a first known event identifier and includes a third potential faulty operation and a corresponding third potential remedy action, and a fourth potential faulty operation and a corresponding fourth potential remedy action, and wherein the fourth set of procedures is associated with a second known event identifier and includes a fifth potential faulty operation and a corresponding fifth potential remedy action;

identifying a second sequential order of execution of the identified third potential remedy action, the fourth potential remedy action, and the fifth potential remedy action based on at least one of the plurality of execution criteria, wherein the one of the plurality of execution criteria includes a number of successful fix data associated each of the third potential remedy action, the fourth potential remedy action, and the fifth potential remedy action, wherein the third potential remedy action is executed first, the fourth potential remedy action is executed second and the fifth potential remedy action is executed last;

sequentially executing, on the computing node, the third potential remedy action;

determining whether the executed third potential remedy action fixes the anomalous operation associated with the computing node;

in response to determining that the executed second potential remedy action does fix the anomalous operation associated with the computing node, transmitting the successful fix notification to the computing node; and inputting the received fault event identifier, the identified third potential faulty operation, and the corresponding third potential remedy action in the historical events dataset to update the historical events dataset.

10. The method of claim 8, further comprising:

in response to determining that the received fault event identifier is not a known fault event identifier, determining, by the AI algorithm, if the one or more computing node parameters is an event type computing node parameter;

in response to determining that the one or more computing node parameters is an event type computing node parameter, accessing a historical computing node events dataset to identify a second set of procedures fix the anomalous operation associated with a computing node, wherein the second set of procedures includes a third potential faulty operation and a corresponding third potential remedy action, and wherein the historical computing node events dataset stores historical remedy actions applied to the computing node over a past time period, and the second set of procedures are included in the historical computing node events dataset;

executing, on the computing node, the third potential remedy action;

determining whether the executed third potential remedy action fixes the anomalous operation associated with the computing node;

in response to determining that the executed second potential remedy action does fix the anomalous operation associated with the computing node, transmitting the successful fix notification to the computing node; and inputting the received fault event identifier, the identified third potential faulty operation, and the corresponding third potential remedy action in the historical events dataset to update the historical events dataset.

11. The method of claim 8, further comprising:

in response to determining that the received fault event identifier is a known fault event identifier, identifying a second set of procedures corresponding to the known fault event identifier from a set of historical faulty operations, wherein the second set of procedures includes a third potential faulty operation and a corresponding third potential remedy action, a fourth potential faulty operation and a corresponding fourth potential remedy action, and wherein the second set of procedures in the set of historical faulty operations have been previously identified to be associated with the known fault event identifier;

identifying a sequential order of execution of the identified third potential remedy action and the fourth potential remedy action based on at least one of a plurality of execution criteria, wherein the one of the plurality of execution criteria includes past successful remedy actions executed at the computing node, wherein the third potential remedy action is executed first, followed by the fourth potential remedy action;

sequentially executing, on the computing node, the third potential remedy action;

determining whether the executed third potential remedy action fixes the anomalous operation associated with the computing node; and in response to determining that the executed third potential remedy action does fix the anomalous operation associated with the computing node, transmitting the successful fix notification to the computing node.

12. The method of claim 8, further comprising:

in response to determining that the received fault event identifier is not a known fault event identifier, identifying, by the AI algorithm, a second set of procedures based at least in part on the data value associated with the one or more computing node parameters exceeding the predefined threshold value, wherein the second set of procedures includes a third potential faulty operation and a corresponding third potential remedy action, a fourth potential faulty operation and a corresponding fourth potential remedy action, and a fifth potential faulty operation and a corresponding fifth potential remedy action;

identifying a second sequential order of execution of the identified third potential remedy action, the fourth potential remedy action, and the fifth potential remedy action based on at least one of the plurality of execution criteria, wherein the one of the plurality of execution criteria includes the number of successful fix data associated each of the third potential remedy action, the fourth potential remedy action, and the fifth potential remedy action, wherein the third potential remedy action is executed first, the fourth potential remedy action is executed second and the fifth potential remedy action is executed last;

sequentially executing, on the computing node, the third potential remedy action;

determining whether the executed third potential remedy action fixes the anomalous operation associated with the computing node;

in response to determining that the executed second potential remedy action does fix the anomalous operation associated with the computing node, transmitting the successful fix notification to the computing node; and inputting the received fault event identifier and the identified third potential faulty operation and the corresponding third potential remedy action in the historical events dataset to update the historical events dataset.

13. The method of claim 8, further comprising:

in response to determining that the executed first potential remedy action does not fix the anomalous operation associated with the computing node, execute the second potential remedy action and transmit a service ticket request to an administrative user device.

14. The method of claim 8, wherein the computing node stores a first software program and a second computing node stores an updated version of the first software program; and the method further comprising:

transmitting a command, as part of executing the first potential remedy action, to the second computing node to install the updated version of the first software program on the computing node.

15. A non-transitory computer-readable medium storing instructions that, when executed by a processor, cause the processor to:

receive, from a computing node, a fault event message, wherein the fault event message comprises a fault event identifier and one or more computing node parameters, wherein the fault event identifier is associated with an anomalous operation performed by the computing node;

determine whether the received fault event identifier is a known fault event identifier based at least in part upon determining if the received fault event identifier is included in a list of known fault event identifiers stored in a historical events dataset;

in response to determining that the received fault event identifier is not a known fault event identifier, identify, by an AI algorithm, a first set of procedures based at least in part on a data value associated with the one or more computing node parameters not exceeding a predefined threshold value, wherein the first set of procedures includes a first potential faulty operation and a corresponding first potential remedy action, and a second potential faulty operation and a corresponding second potential remedy action, wherein the AI algorithm is trained based on a rules dataset that includes one or more rules to identify the first set of procedures to fix the anomalous operation associated with a computing node, wherein one of the rules defines identifying the first set of procedures when the data value associated with the one or more computing node parameters does not exceed a predefined threshold value;

identify a sequential order of execution of the identified first potential remedy action and the second potential remedy action based on at least one of a plurality of execution criteria stored in the historical events dataset, wherein the one of the plurality of execution criteria includes past number of successful fix data associated each of the first potential remedy action and the second potential remedy action, wherein the identified sequential order first executes the first potential remedy action, followed by the second potential remedy action;

sequentially execute, on the computing node, the first potential remedy action;

determine whether the executed first potential remedy action fixes the anomalous operation associated with the computing node;

in response to determining that the executed first potential remedy action does not fix the anomalous operation associated with the computing node, sequentially execute, on the computing node, the second potential remedy action;

determine whether the executed second potential remedy action fixes the anomalous operation associated with the computing node;

in response to determining that the executed second potential remedy action does fix the anomalous operation associated with the computing node, transmit a successful fix notification to the computing node; and input the received fault event identifier, the identified second potential faulty operation, and the corresponding second potential remedy action in the historical events dataset to update the historical events dataset.

16. The non-transitory computer-readable medium of claim 15, wherein the instructions further cause the processor to:

in response to determining that the received fault event identifier is not a known fault event identifier, determine, by the AI algorithm, if the one or more computing node parameters is an event type computing node parameter;

in response to determining that the one or more computing node parameters is an event type computing node parameter, access the historical events dataset to identify a second set of procedures to fix the anomalous operation associated with a computing node, wherein the second set of procedures includes a combination of a third set of procedures and a fourth set of procedures, and wherein the third set of procedures is associated with a first known event identifier and includes a third potential faulty operation and a corresponding third potential remedy action, and a fourth potential faulty operation and a corresponding fourth potential remedy action, and wherein the fourth set of procedures is associated with a second known event identifier and includes a fifth potential faulty operation and a corresponding fifth potential remedy action;

identify a second sequential order of execution of the identified third potential remedy action, the fourth potential remedy action, and the fifth potential remedy action based on at least one of the plurality of execution criteria, wherein the one of the plurality of execution criteria includes a number of successful fix data associated each of the third potential remedy action, the fourth potential remedy action, and the fifth potential remedy action, wherein the third potential remedy action is executed first, the fourth potential remedy action is executed second and the fifth potential remedy action is executed last;

sequentially execute, on the computing node, the third potential remedy action;

determine whether the executed third potential remedy action fixes the anomalous operation associated with the computing node;

in response to determining that the executed second potential remedy action does fix the anomalous operation associated with the computing node, transmit the successful fix notification to the computing node; and input the received fault event identifier, the identified third potential faulty operation, and the corresponding third potential remedy action in the historical events dataset to update the historical events dataset.

17. The non-transitory computer-readable medium of claim 15, wherein the instructions further cause the processor to:

in response to determining that the received fault event identifier is not a known fault event identifier, determine, by the AI algorithm, if the one or more computing node parameters is an event type computing node parameter;

in response to determining that the one or more computing node parameters is an event type computing node parameter, access a historical computing node events dataset to identify a second set of procedures fix the anomalous operation associated with a computing node, wherein the second set of procedures includes a third potential faulty operation and a corresponding third potential remedy action, and wherein the historical computing node events dataset stores historical remedy actions applied to the computing node over a past time period, and the second set of procedures are included in the historical computing node events dataset;

execute, on the computing node, the third potential remedy action;

determine whether the executed third potential remedy action fixes the anomalous operation associated with the computing node;

in response to determining that the executed second potential remedy action does fix the anomalous operation associated with the computing node, transmit the successful fix notification to the computing node; and input the received fault event identifier, the identified third potential faulty operation, and the corresponding third potential remedy action in the historical events dataset to update the historical events dataset.

18. The non-transitory computer-readable medium of claim 15, wherein the instructions further cause the processor to:

in response to determining that the received fault event identifier is a known fault event identifier, identify a second set of procedures corresponding to the known fault event identifier from a set of historical faulty operations, wherein the second set of procedures includes a third potential faulty operation and a corresponding third potential remedy action, a fourth potential faulty operation and a corresponding fourth potential remedy action, and wherein the second set of procedures in the set of historical faulty operations have been previously identified to be associated with the known fault event identifier;

identify a sequential order of execution of the identified third potential remedy action and the fourth potential remedy action based on at least one of a plurality of execution criteria, wherein the one of the plurality of execution criteria includes past successful remedy actions executed at the computing node, wherein the third potential remedy action is executed first, followed by the fourth potential remedy action;

sequentially execute, on the computing node, the third potential remedy action;

determine whether the executed third potential remedy action fixes the anomalous operation associated with the computing node; and in response to determining that the executed third potential remedy action does fix the anomalous operation associated with the computing node, transmit the successful fix notification to the computing node.

19. The non-transitory computer-readable medium of claim 15, wherein the instructions further cause the processor to:

in response to determining that the received fault event identifier is not a known fault event identifier, identify, by the AI algorithm, a second set of procedures based at least in part on the data value associated with the one or more computing node parameters exceeding the predefined threshold value, wherein the second set of procedures includes a third potential faulty operation and a corresponding third potential remedy action, a fourth potential faulty operation and a corresponding fourth potential remedy action, and a fifth potential faulty operation and a corresponding fifth potential remedy action;

identify a second sequential order of execution of the identified third potential remedy action, the fourth potential remedy action, and the fifth potential remedy action based on at least one of the plurality of execution criteria, wherein the one of the plurality of execution criteria includes the number of successful fix data associated each of the third potential remedy action, the fourth potential remedy action, and the fifth potential remedy action, wherein the third potential remedy action is executed first, the fourth potential remedy action is executed second and the fifth potential remedy action is executed last;

sequentially execute, on the computing node, the third potential remedy action;

determine whether the executed third potential remedy action fixes the anomalous operation associated with the computing node;

in response to determining that the executed second potential remedy action does fix the anomalous operation associated with the computing node, transmit the successful fix notification to the computing node; and input the received fault event identifier and the identified third potential faulty operation and the corresponding third potential remedy action in the historical events dataset to update the historical events dataset.

20. The non-transitory computer-readable medium of claim 15, wherein the computing node stores a first software program and a second computing node stores an updated version of the first software program; and the instructions further cause the processor to:

transmit a command, as part of executing the first potential remedy action, to the second computing node to install the updated version of the first software program on the computing node.

* * * * *